(12) United States Patent
Onaizi (10) Patent No.: US 11,708,517 B1
(45) Date of Patent: Jul. 25, 2023

(54) HYDROGEN SULFIDE MITIGATING DRILLING FLUID AND METHOD OF DRILLING SUBTERRANEAN GEOLOGICAL FORMATION

(71) Applicant: KING FAHD UNIVERSITY OF PETROLEUM AND MINERALS, Dhahran (SA)

(72) Inventor: Sagheer A. Onaizi, Dhahran (SA)

(73) Assignee: KING FAHD UNIVERSITY OF PETROLEUM AND MINERALS, Dhahran (SA)

(*) Notice: Subject to any disclaimer, the term of this patent is extended or adjusted under 35 U.S.C. 154(b) by 0 days.

(21) Appl. No.: 17/857,411

(22) Filed: Jul. 5, 2022

(51) Int. Cl.
*C09K 8/16* (2006.01)
*C09K 8/532* (2006.01)

(52) U.S. Cl.
CPC ............... *C09K 8/16* (2013.01); *C09K 8/532* (2013.01); *C09K 2208/20* (2013.01)

(58) Field of Classification Search
None
See application file for complete search history.

(56) References Cited

U.S. PATENT DOCUMENTS

| | | | |
|---|---|---|---|
| 4,382,912 A | 5/1983 | Madgavkar et al. | |
| 4,956,160 A | 9/1990 | Reichert | |
| 8,822,386 B2 | 9/2014 | Quintero et al. | |
| 10,501,676 B2 | 12/2019 | Elkatatny et al. | |
| 2013/0272943 A1* | 10/2013 | Braga | B01D 53/00 428/537.1 |
| 2021/0355809 A1* | 11/2021 | Oduro | C09K 8/54 |

FOREIGN PATENT DOCUMENTS

| | | |
|---|---|---|
| CN | 112226215 A | 1/2021 |
| SU | 1542594 A1 | 2/1990 |

OTHER PUBLICATIONS

Ghayedi, et al. ; Laboratory investigation of the effect of GO-ZnOnanocomposite on drilling fluid properties and its potentialon HS removal in oil reservoirs ; Journal of Petroleum Science and Engineering, vol. 184 ; Jan. 2020 ; Abstract Only ; 3 Pages.

Sayyadnejad, et al. ; Removal of hydrogen sulfide by zinc oxide nanoparticles in drilling fluid ; Int. J. Environ. Sci. Tech, 5(4) ; pp. 565-569 ; 2008 ; 5 Pages.

Li, et al. ; Effect of La-Modified Supporter on H S Removal Performance of Mn/La/Al O Sorbent in a Reducing Atmosphere ; Ind. Eng. Chem. Res., 58, 18 ; pp. 8260-8270 ; Apr. 17, 2019 ; Abstract Only ; 2 Pages.

* cited by examiner

*Primary Examiner* — Charles R Nold
(74) *Attorney, Agent, or Firm* — Oblon, McClelland, Maier & Neustadt, L.L.P.

(57) ABSTRACT

A method of drilling a subterranean geological formation is described. The method includes driving a drill bit to form a wellbore in the subterranean geological formation thereby producing a formation fluid including hydrogen sulfide. The method further includes injecting a drilling fluid into the subterranean geological formation through the wellbore. The drilling fluid includes an aqueous solvent, a hydrogen sulfide scavenger including particles of a manganese oxide supported on a porous support. The particles are suspended in the aqueous solvent. The method further includes reacting the hydrogen sulfide scavenger with the hydrogen sulfide present in the formation fluid to form a manganese sulfide.

9 Claims, 3 Drawing Sheets

HYDROGEN SULFIDE MITIGATING DRILLING FLUID AND METHOD OF DRILLING SUBTERRANEAN GEOLOGICAL FORMATION

CROSS-REFERENCE TO RELATED APPLICATION

The present application is related to the application titled "Method of Removing Sulfide-Containing Scale".

BACKGROUND

Technical Field

The present disclosure is directed to a method of drilling a subterranean geological formation with a drilling fluid, and particularly, to the method of drilling the subterranean geological formation with a drilling fluid including an aqueous solvent and a hydrogen sulfide scavenger.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Driving a drill bit to form a wellbore in a subterranean geological formation is a critical part of a wide variety of processes activities, such as petroleum or natural gas production. Some petroleum, natural gas, or other natural substance deposits may contain hydrogen sulfide, which is highly toxic to humans and animals and reactive with many materials which may be used in the drilling. A drilling fluid, also referred to as the drilling mud, is used in well drilling applications. The drilling fluid lubricates and cools the drill bit, removes drilling cuttings and solid suspensions, seals a permeable formation, and prevents formation damage by controlling a subsurface pressure.

Conventional drilling fluids are devoid of components which may efficiently reduce or eliminate the hydrogen sulfide gas which may be present in various formation fluids. Hence, there is a need of methods which may reduce or eliminate the aforementioned limitations.

One object of the present disclosure is to provide a method for drilling in a well to mitigate hydrogen sulfide. It is another object to prove a hydrogen sulfide scavenger comprising particles of a manganese oxide supported on a porous support.

SUMMARY

In an exemplary embodiment, a method of drilling a subterranean geological formation is described. The method includes driving a drill bit to form a wellbore in the subterranean geological formation thereby producing a formation fluid including hydrogen sulfide. The method further includes injecting a drilling fluid into the subterranean geological formation through the wellbore. The drilling fluid includes an aqueous solvent, a hydrogen sulfide scavenger including particles of a manganese oxide supported on a porous support. The particles are suspended in the aqueous solvent. The method further includes reacting the hydrogen sulfide scavenger with the hydrogen sulfide present in the formation fluid to form a manganese sulfide.

In some embodiments, the porous support is at least one selected from the group consisting of an aluminum oxide, a zirconium oxide, a silicate material, a carbon nanomaterial, a metal organic framework (MOF), and a zeolitic imidazolate framework (ZIF).

In some embodiments, the porous support is aluminum oxide.

In some embodiments, the aluminum oxide is gamma (γ) aluminum oxide.

In some embodiments, the hydrogen sulfide scavenger has a molar ratio of manganese to aluminum of 1:1 to 1:5.

In some embodiments, the hydrogen sulfide scavenger is present as particles having a mean particle size of 100 to 10,000 nanometers (nm).

In some embodiments, the particles of manganese oxide have a mean particle size of 5 to 150 nm and are on at least one selected from the group consisting of an exterior surface of the porous support and within pores of the porous support.

In some embodiments, the hydrogen sulfide scavenger is present in the drilling fluid in an amount of 0.1 to 10 wt. %, based on a total weight of the drilling fluid.

In some embodiments, the hydrogen sulfide scavenger reacts with 0.025 to 0.125 equivalents of the hydrogen sulfide by weight.

In some embodiments, the formation fluid is a sour crude oil or a sour gas.

In some embodiments, the drilling fluid further includes at least one selected from the group consisting of a viscosifier, a fluid loss prevention agent, a pH adjusting agent, a clay stabilizer, a filtration rate agent, and a weighting agent.

In some embodiments, a drilling fluid includes an aqueous solvent. The drilling fluid includes a hydrogen sulfide scavenger including particles of a manganese oxide supported on a porous support. The particles are suspended in the aqueous solvent. The porous support is at least one selected from the group consisting of an aluminum oxide, a zirconium oxide, a silicate material, a carbon nanomaterial, a metal organic framework (MOF), and a zeolitic imidazolate framework (ZIF).

In some embodiments, the drilling fluid further includes at least one selected from the group consisting of a viscosifier, a fluid loss prevention agent, a pH adjusting agent, a clay stabilizer, a filtration rate agent, and a weighting agent.

In some embodiments, the hydrogen sulfide scavenger is present in an amount of 0.1 to 10 wt. %, based on a total weight of drilling fluid.

In some embodiments, the hydrogen sulfide scavenger has a mean particle size of 100 to 10,000 nm. The particles of manganese oxide have a mean particle size of 5 to 150 nm and are on at least one selected from the group consisting of an exterior surface of the porous support and within pores of the porous support.

In some embodiments, the porous support is aluminum oxide.

In some embodiments, the aluminum oxide is gamma (γ) aluminum oxide.

In some embodiments, the hydrogen sulfide has a molar ratio of manganese to aluminum of 1:1 to 1:5.

The foregoing general description of the illustrative present disclosure and the following detailed description thereof are merely exemplary aspects of the teachings of this disclosure and are not restrictive.

BRIEF DESCRIPTION OF THE DRAWINGS

A more complete appreciation of this disclosure and many of the attendant advantages thereof will be readily obtained as the same becomes better understood by reference to the following detailed description when considered in connection with the accompanying drawings, wherein.

DETAILED DESCRIPTION

In the following description, it is understood that other embodiments may be utilized and structural and operational changes may be made without departure from the scope of the present embodiments disclosed herein.

Embodiments of the present disclosure will now be described more fully hereinafter with reference to the accompanying drawings, in which some, but not all embodiments of the disclosure are shown. In the drawings, like reference numerals designate identical or corresponding parts throughout the several views.

Furthermore, the terms "approximately," "approximate," "about," and similar terms generally refer to ranges that include the identified value within a margin of 20%, 10%, or preferably 5%, and any values there between.

As used herein, the words "a" and "an" and the like carry the meaning of "one or more". Within the description of this disclosure, where a numerical limit or range is stated, the endpoints are included unless stated otherwise. Also, all values and subranges within a numerical limit or range are specifically included as if explicitly written out.

As used herein, the terms "optional" or "optionally" means that the subsequently described event(s) can or cannot occur or the subsequently described component(s) may or may not be present (e.g., 0 wt. %).

As used herein, the term "alkyl" unless otherwise specified refers to both branched and straight chain saturated aliphatic primary, secondary, and/or tertiary hydrocarbon fragments of typically $C_1$ to $C_{20}$. Non-limiting examples of such hydrocarbon fragments include methyl, trifluoromethyl, ethyl, propyl, isopropyl, cyclopropyl, butyl, isobutyl, t-butyl, pentyl, cyclopentyl, isopentyl, neopentyl, hexyl, isohexyl, cyclohexyl, cyclohexylmethyl, 3-methylpentyl, 2,2-dimethylbutyl, 2,3-dimethylbutyl, 2-ethylhexyl, heptyl, octyl, nonyl, 3,7-dimethyloctyl, decyl, undecyl, dodecyl, tridecyl, 2-propylheptyl, tetradecyl, pentadecyl, hexadecyl, heptadecyl, octadecyl, nonadecyl, and eicosyl.

The term "cycloalkyl" refers to cyclized alkyl groups. Exemplary cycloalkyl groups include, but are not limited to, cyclopropyl, cyclobutyl, cyclopentyl, cyclohexyl, norbornyl, and adamantyl. Branched cycloalkyl groups such as exemplary 1-methylcyclopropyl and 2-methylcyclopropyl groups are included in the definition of cycloalkyl as used in the present disclosure.

The term "alkoxy" refers to a straight or branched chain alkoxy including, but not limited to, methoxy, ethoxy, propoxy, isopropoxy, butoxy, isobutoxy, secondary butoxy, tertiary butoxy, pentoxy, isopentoxy, hexyloxy, heptyloxy, octyloxy, nonyloxy, and decyloxy.

The term "halogen", as used herein, means fluoro, chloro, bromo and iodo.

As used herein, the term "substituted" refers to at least one hydrogen atom is replaced with a non-hydrogen group, provided that normal valencies are maintained and that the substitution results in a stable compound. When a R group (denoted as $R_1$, $R_2$, and so forth) is noted as "optionally substituted", the substituents are selected from the exemplary group including, but not limited to, halogen (e.g., chlorine, bromine, fluorine or iodine), alkoxy (i.e., straight chain alkoxy having 1 to 3 carbon atoms, and includes, for example, methoxy, ethoxy, and propoxy), hydroxy, amino, alkylamino, thiol, alkylthio, sulfonamido (e.g., —$SO_2NH_2$), substituted sulfonamide (e.g., —$SO_2$NHalkyl or cases where there are two alkyl substituents on one nitrogen), nitro, cyano, carboxy, carbamyl (e.g., —$CONH_2$), substituted carbamyl (e.g., —CONHalkyl or cases where there are two alkyl substituents on one nitrogen), and mixtures thereof. The substituents may be either unprotected, or protected as necessary, as known to those skilled in the art, for example, as taught in Greene et al., "Protective Groups in Organic Synthesis", John Wiley and Sons, Second Edition, 1991, hereby incorporated by reference in its entirety).

According to a first aspect, the present disclosure relates to a method of drilling a subterranean geological formation. The method involves driving a drill bit to form a wellbore into the subterranean geological formation thereby producing a formation fluid. The method includes injecting a drilling fluid into the subterranean geological formation through the wellbore. The drilling fluid comprises an aqueous solvent and a hydrogen sulfide scavenger comprising particles of a manganese oxide supported on a porous support, the particles being suspended in the aqueous solvent. The hydrogen sulfide scavenger reacts with the hydrogen sulfide present in the formation fluid to form a manganese sulfide.

Figure 1:
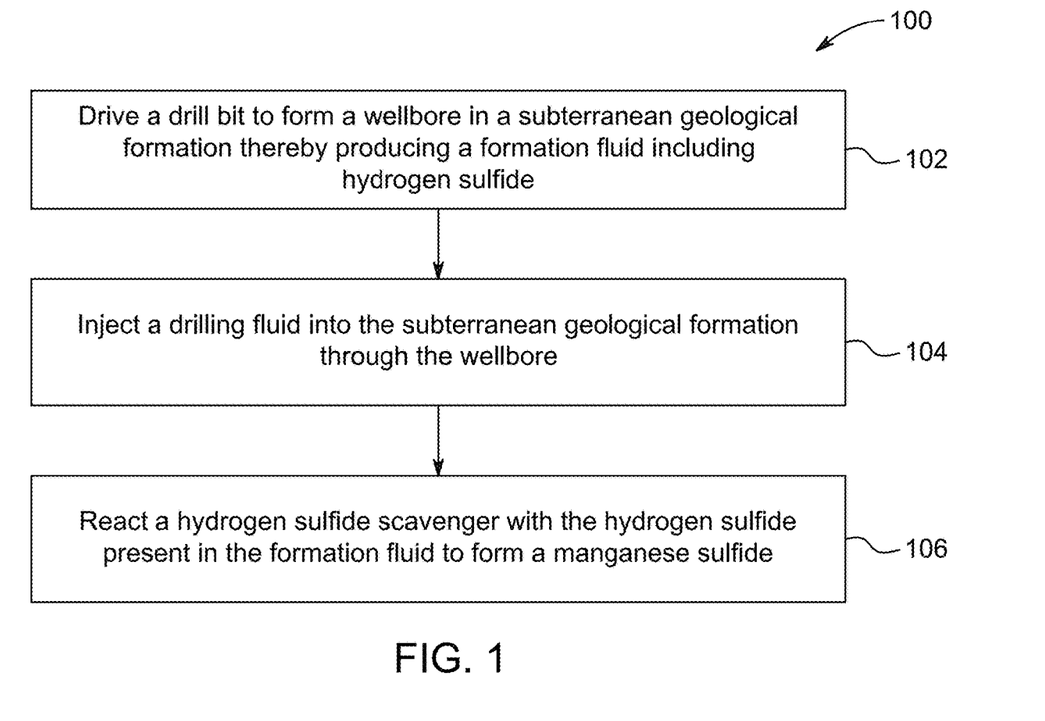
FIG. 1 is a schematic flow chart of a method of drilling a subterranean geological formation, according to certain embodiments.

FIG. 1 illustrates a schematic flow chart of a method 100 of drilling the subterranean geological formation. The order in which the method 100 is described is not intended to be construed as a limitation, and any number of the described method steps can be combined in any order to implement the method 100. Additionally, individual steps may be removed or skipped from the method 100 without departing from the spirit and scope of the present disclosure.

At step 102, the method 100 includes driving a drill bit into the subterranean geological formation. This may be accomplished using any suitable equipment or technique known to one of ordinary skill in the art. There are no specific limitations placed on, for example, the type of drill bit used, the equipment used in the driving, or other suitable equipment used such as positioning devices, monitoring devices, ground scanning devices, or the like. In some embodiments, a site of interest is first identified, and a drill truck drills a starter hole. Then, the wellbore is drilled with the drill bit coupled to a motor. The wellbore may be drilled to a depth of at least 1,000 m, preferably at least 2,000 m, preferably at least 5,000 m, preferably at least 7,000 m, but no more than 10,000 m. In some embodiments, a site of interest is first identified, and a drill truck drills a starter hole. The wellbore can be drilled with the drill bit coupled to a motor. The drill bit and the motor used in this disclosure are not meant to be limiting and various drill bits and motors may be utilized. In some embodiments, the drill bit may include, but is not limited to a twist drill, counterbore, countersink and flat bottom boring. The method 100 includes driving the drill bit to form a wellbore into the subterranean geological formation. The subterranean geological formation may include, but is not limited to, an oil reservoir, a gas reservoir, a mixed hydrocarbon bearing subterranean formation, a saline formation, or a coal bed. In the present disclosure, the wellbore may be a portion of an oil well or a gas well, i.e. a borehole, that faces a formation matrix of the subterranean geological formation. In some embodiments, the wellbore includes casing that is made up of one or more metal selected from one or more of stainless steel, aluminum, fiberglass and titanium. In some embodiments, the wellbore may be a horizontal wellbore or a multilateral wellbore. The horizontal wellbore may include one or more sections located parallel to a ground surface.

The driving of the drill bit to form the wellbore into the subterranean geological formation thereby produces a formation fluid. The composition of the formation fluid that may be produced during the drilling may depend on the type of the subterranean geological formation. In some embodiments, the formation fluid is at least one selected from a sour gas and a sour crude oil. The sour gas is a natural gas including an amount of the $H_2S$. In some embodiments, the formation fluid may include, but is not limited to, natural gas (i.e., primarily methane), hydrocarbon or non-hydrocarbon gases (including condensable and non-condensable gases), light hydrocarbon liquids, heavy hydrocarbon liquids, rock, oil shale, bitumen, oil sands, tar, coal, and/or water. Further, the non-condensable gases may include, but are not limited to hydrogen, carbon monoxide, carbon dioxide and methane. In some other embodiments, the formation fluid may be in the form of a gaseous fluid, a liquid, or a double-phase fluid. In some embodiments, the formation fluid includes the $H_2S$. Microorganisms such as sulfate reducing bacteria may generate the $H_2S$ in gas and oil reservoirs.

At step 104, the method 100 includes injecting the drilling fluid into the subterranean geological formation through the wellbore. In some embodiments, the drilling fluid composition is injected into the subterranean geological formation through the wellbore to maintain a temperature and a pressure in the wellbore that is higher than a static pressure of the subterranean geological formation. A formation fluid may be produced during or after the drilling. During the drilling, the drilling fluid composition is injected optionally into the subterranean geological formation through the well bore to lubricate and cool the drill bit and to remove drilling cuttings. In some embodiments, the drilling fluid composition is injected at a flow rate ranging from 12 to 26 L/s, preferably 15 to 22 L/s, more preferably 17 to 20 L/s.

In some embodiments, the method comprises cycling the drilling fluid composition described below with a different drilling fluid composition, such as one which does not contain a $H_2S$ scavenger. That is, for a portion of the drilling, the drilling fluid composition described below is used and for a different portion of the drilling, the other drilling fluid composition is used. Such portions may be performed in any suitable pattern and with any suitable period or frequency. For example, when a level of $H_2S$ in a formation fluid or other suitable fluid rises to a threshold level, the drilling fluid composition described below may be used. The drilling fluid composition described below may be used until the level of $H_2S$ drops below the threshold level. Such cycling may be advantageous for reasons such as safety of workers associated with the drilling operations, avoiding corrosion or other degradation of drilling hardware or other wellbore hardware, or economic factors such as cost. In some embodiments, the other drilling fluid composition has a composition similar to that of the drilling fluid composition described below but which does not comprise the $H_2S$ scavenger. The cycling may comprise addition of the $H_2S$ scavenger described below to the other drilling fluid composition to form the drilling fluid composition described below. That is, the cycling may involve the addition of "pulses" of different components, such as the $H_2S$ scavenger into a drilling fluid to form the drilling fluid composition described below.

At step 106, the method 100 includes reacting the hydrogen sulfide scavenger with the hydrogen sulfide present in the formation fluid to form the manganese sulfide. In some embodiments, the method 100 may include reacting the hydrogen sulfide in the wellbore with the manganese oxide to form the elemental sulfur.

The drilling fluid includes an aqueous solvent. The drilling fluid of the present disclosure comprises a hydrogen sulfide scavenger comprising particles of a manganese oxide supported on a porous support, the particles being suspended in the aqueous solvent.

In general, the aqueous solvent may be any water containing solution, including saltwater, hard water, and/or fresh water. For purposes of this description, the term "saltwater" may include saltwater with a chloride ion content of between about 6000 ppm and saturation, and is intended to encompass seawater and other types of saltwater including groundwater containing additional impurities typically found therein. The term "hard water" may include water having mineral concentrations between about 2000 mg/L and about 300,000 mg/L. The term "fresh water" may include water sources that contain less than 6000 ppm, preferably less than 5000 ppm, preferably less than 4000 ppm, preferably less than 3000 ppm, preferably less than 2000 ppm, preferably less than 1000 ppm, preferably less than 500 ppm of salts, minerals, or any other dissolved solids. Salts that may be present in saltwater, hard water, and/or fresh water may be, but are not limited to, cations such as sodium, magnesium, calcium, potassium, ammonium, and iron, and anions such as chloride, bicarbonate, carbonate, sulfate, sulfite, phosphate, iodide, nitrate, acetate, citrate, fluoride, and nitrite. In some embodiments, the drilling fluid further comprises an oil phase present as an oil-in-water emulsion within the aqueous solvent.

The hydrogen sulfide scavenger comprises particles of a manganese oxide supported on a porous support.

The porous support is at least one selected from the group consisting of an aluminum oxide, a zirconium oxide, a silicate material, a carbon nanomaterial such as carbon nanotubes, a metal organic framework (MOF), and a zeolitic imidazolate framework (ZIF).

In general, the aluminum oxide may be any suitable aluminum oxide known to one of ordinary skill in the art. The aluminum oxide may be any suitable polymorph or combination of polymorphs of aluminum oxide, such as $\alpha\text{-}Al_2O_3$, $\gamma\text{-}Al_2O_3$, $\theta\text{-}Al_2O_3$, and $\kappa\text{-}Al_2O_3$.

In general, the zirconium oxide may be any suitable zirconium oxide known to one of ordinary skill in the art. The zirconium oxide may be any suitable polymorph or combination of polymorphs of zirconium oxide, such as monoclinic zirconia, tetragonal zirconia, and cubic zirconia.

In general, any suitable silicate and/or aluminosilicate matrix known to one of ordinary skill in the art may be used in the nanomedicinal composition. Examples of such suitable porous silica, silicate, or aluminosilicate materials include, but are not limited to, MCM-41, MCM-48, Q-10 silica, hydrophobic silica, mesobeta, mesoZSM-5, SBA-15, KIT-5, KIT-6, SBA-16, mesoporous silica spheres, zeolitic materials, and halloysite. The term "silicate matrix" should be understood to include silica itself. Methods of obtaining the various types porous silica, silicate, or aluminosilicate material are well-known in the art [see for example Gobin, Oliver Christian "SBA-16 Materials: Synthesis, Diffusion, and Sorption Properties" Dissertation, Laval University, Ste-Foy, Quebec, Canada, January 2006, in particular section 2.2; and U.S. patent application Ser. No. 15/478,794—both incorporated herein by reference in their entireties]. Aluminosilicate materials may be characterized by a ratio of Si to Al present in the material. In general, the aluminosilicate material may have any suitable Si:Al molar ratio. Examples of such suitable Si:Al molar ratios are 1000:1 to 1:250, preferably 500:1 to 1:200, preferably 250:1 to 1:100, preferably 150:1 to 1:75, preferably 100:1 to 1:50, preferably 50:1 to 1:25, preferably 25:1 to 1:10, preferably 10:1 to 1:5, preferably 5:1 to 1:2.5, preferably 2.5:1 to 1:1.5, preferably 1.5:1 to 1:1. In general, the elemental composition of the silicate and/or aluminosilicate material, including the Si:Al molar ratio, may be determined by any suitable technique known to one of ordinary skill in the art. Examples of suitable such techniques include mass spectrometry techniques such as inductively-coupled plasma mass spectrometry (ICP-MS), atomic emission spectroscopy techniques such as inductively-coupled plasma atomic emission spectroscopy (ICP-AES) (also referred to as ICP optical emission spectroscopy, ICP-OES), atomic absorption spectroscopy techniques such as inductively-coupled plasma atomic absorption spectroscopy (ICP-AAS), and X-ray spectroscopy techniques such as X-ray photoelectron spectroscopy.

Silicates and aluminosilicates are materials which comprise $SiO_4$ tetrahedra (and $AlO_4^-$ tetrahedra, $AlO_6$ octahedra, and/or $Al(OH)_6$ octahedra in the case of aluminosilicates) joined together in a wide variety of structural motifs. The tetrahedra (and if applicable octahedra) in the silicate and/or aluminosilicate material of the present invention may in general adopt any structural motif present in other silicate materials, such as isolated tetrahedra as in neosilicates (single tetrahedra, also called orthosilicates) and sorosilicates (double tetrahedra), chains of tetrahedra such as inosilicates (both single chain as in pyroxene group silicates and double chain as in amphibole group silicates), rings of tetrahedra as in cyclosilicates, sheets of tetrahedra as in phyllosilicates, and three-dimensional frameworks as in tectosilicates. In some aluminosilicates, the material comprises a substructure comprising silicon-containing and/or aluminum-containing tetrahedral and a substructure comprising aluminum-containing octahedral. An example of such an arrangement is the mineral kaolin, which comprises sheets of alternating tetrahedra-containing layers and octahedra-containing layers. The arrangement of isolated tetrahedra, chains of tetrahedra, sheets of tetrahedra, or three-dimensional frameworks may give rise to channels, pores, cages, or other spaces within the silicate and/or aluminosilicate which is capable of hosting material which is not the silicate and/or aluminosilicate itself. Examples of materials, particularly those relevant to the current disclosure, include water, organic molecules, and inorganic nanoparticles. While the larger structures formed of tetrahedra (i.e. chains, rings, sheets, and three-dimensional frameworks) may themselves be ordered, the arrangement of these larger structures may be disordered. Such disorder may give rise to a material which is amorphous by techniques for determining crystallinity or crystal structure such as powder X-ray diffraction (PXRD). Alternatively, the larger structures may be ordered, giving rise to a crystalline material.

MCM-41 (Mobil Composition of Matter No. 41) is a mesoporous silica material with a hierarchical structure from a family of silicate and aluminosilicate solids that were developed by researchers at Mobil Oil Corporation and that can be used as catalysts or catalyst supports. MCM-41 and MCM-48 both comprise an amorphous silica wall and possess long range ordered framework with uniform mesopores. These materials also possess large surface area, which can be up to more than 1,000 $m^2$ $g^{-1}$. The pore diameter of these materials can be controlled to fall within a mesoporous range between 1.5 and 20 nm by adjusting the synthesis conditions and/or by employing surfactants with different chain lengths in their preparation. In embodiments where the porous silicate matrix is MCM-41, the nanocarrier may be referred to as a "MCM-41 nanocarrier".

KIT-6 is a mesoporous silica material. KIT-6 has a bicontinuous cubic mesostructure with Ia3d symmetry. KIT-6 is characterized by an interpenetrating cylindrical pore system. Such pores typically have a pore size from about 3.5 to about 18.5 nm and can be controlled by various parameters during the synthesis such as synthesis temperature.

Halloysite is a naturally occurring clay material comprising nanotubes made of aluminosilicate kaolin sheets rolled into a tube shape. Sometimes the kaolin sheets are rolled several times. As described above, such kaolin sheets comprise a tetrahedral layer comprising silicon-containing tetrahedra and an octahedral layer comprising aluminum-containing octahedral. These sheets are typically rolled to place the tetrahedral layer on the exterior surface of the nanotube and the octahedral layer on the interior surface of the nanotube. The silicon-rich tetrahedral layer gives the halloysite nanotube an exterior surface rich in siloxane functional groups and typically a negative charge. The aluminum-rich octahedral layer gives the halloysite nanotube an interior surface rich in aluminol functional groups and typically a positive charge. The size and shape of halloysite nanotubes are typically defined by a nanotube outer diameter, a nanotube length, and sometimes an aspect ratio. Sometimes an inner diameter or a nanotube wall thickness is also used to further define the size and shape of nanotubes. In some embodiments, the halloysite nanotubes have a mean nanotube outer diameter of 10 to 125 nm, preferably 12.5 to 110 nm, preferably 15 to 100 nm, preferably 17.5 to 95 nm, preferably 20 to 90 nm, preferably 22.5 to 85 nm, preferably 25 to 80 nm, preferably 27.5 to 75 nm, preferably 30 to 70 nm. In some embodiments, the halloysite nanotubes have a mean inner diameter of 5 to 22.5 nm, preferably 7.5 to 20 nm, preferably 10 to 17.5 nm, preferably 11 to 16 nm, preferably 12 to 15 nm. In some embodiments, the halloysite nanotubes have a mean nanotube length of 0.25 to 7.5 µm, preferably 0.35 to 7 µm, preferably 0.5 to 5 µm preferably 0.75 to 4 µm, preferably 0.9 to 3.5 µm, preferably 1 to 3 µm. In some embodiments, the halloysite nanotubes have an aspect ratio of 2:1 to 750:1, preferably 5:1 to 500:1, preferably 7.5:1 to 250:1, preferably 10:1 to 150:1, preferably 12.5:1 to 125:1, preferably 14:1 to 100:1.

The shape of the halloysite nanotubes, being hollow, gives the halloysite nanotubes an interior surface and an exterior surface. In some embodiments, the interior surface is substantially the same as the exterior surface. In this context, "substantially the same" may refer to or be measured by any suitable structural or functional parameter or property known to one of ordinary skill in the art. Examples of such suitable structural parameters or properties include, but are not limited to chemical composition (including in particular Si:Al molar ratio), charge identity or density, orientation of tetrahedra, porosity, crystallographic characteristic such as strain or orientation, functional group identity or density, and binding or adsorption affinity for organic molecules and/or inorganic materials. In alternative embodiments, the interior surface is not substantially the same as the exterior surface. In some embodiments, the halloysite nanotubes have an exterior surface which is negatively charged and an interior surface which is positively charged. In some embodiments, such a charge difference is the result of a compositional difference between the exterior surface and the interior surface. Such a compositional difference may be in the form of a difference in an amount of silicon and/or aluminum present. In some embodiments, the exterior surface is silicon-rich (e.g. having a Si:Al molar ratio of approximately 1000:1 to 5:1). In some embodiments, the interior surface is aluminum-rich (e.g. having a Si:Al molar ratio of 1:2.5 to 1:250).

The shape of the halloysite nanotubes encloses an interior volume bound by the interior surface of the nanotube. The interior volume may be substantially cylindrical in shape. The halloysite nanotubes have at least one (preferably both) ends open, permitting substances to pass into the interior volume through said open ends. Materials (e.g. the cerium oxide nanoparticles and/or pharmaceutical agent mixture) may be contained within the interior volume. Such materials may remain within the interior volume though interaction with the interior surface of the halloysite nanotube. In some embodiments, the layers of the silicate and/or aluminosilicate material may further comprise in-layer pores. Such in-layer pores are preferably oriented substantially perpendicular to the length of the nanotube. The in-layers pores may allow access to the interior volume or to an interlayer volume described below. Such pores may comprise a pore wall. This pore wall is a distinct surface from the interior surface and the exterior surface of the halloysite nanotube. The pore wall may be substantially the same as one or both of the interior surface and the exterior surface of the halloysite nanotube. Alternatively, the pore wall may be distinct from the interior surface or the exterior surface in terms of properties such as chemical composition (including in particular Si:Al molar ratio), charge identity or density, orientation of tetrahedra, crystallographic characteristic such as strain or orientation, functional group identity or density, and binding or adsorption affinity for organic molecules and/or inorganic materials. Embodiments in which the halloysite nanotubes comprise more than one layer of silicate and/or aluminosilicate material, the nanotubes may further comprise an interlayer volume defined between the layers. The interlayer volume may be defined by an inner interlayer surface and an outer interlayer surface. Due to the orientation, the inner interlayer surface may be substantially the same as the exterior surface of the halloysite nanotube while the outer interlayer surface may be substantially the same as the interiors surface of the nanotube. The interlayer volume may be accessible at the open ends of the halloysite nanotubes or by in-layer pores described above.

As used herein, the term "zeolitic material" refers to a material having the crystalline structure or three-dimensional framework of, but not necessarily the elemental composition of, a zeolite. Zeolites are porous silicate or aluminosilicate minerals that occur in nature. Elementary building units of zeolites are $SiO_4$ (and if appropriate, $AlO_4$) tetrahedra. Adjacent tetrahedra are linked at their corners via a common oxygen atom, which results in an inorganic macromolecule with a three-dimensional framework (frequently referred to as the zeolite framework). The three-dimensional framework of a zeolite also comprises channels, channel intersections, and/or cages having dimensions in the range of 0.1-10 nm, preferably 0.2-5 nm, more preferably 0.2-2 nm. Water molecules may be present inside these channels, channel intersections, and/or cages. Zeolites which are devoid of aluminum may be referred to as "all-silica zeolites" or "aluminum-free zeolites". Some zeolites which are substantially free of, but not devoid of, aluminum are referred to as "high-silica zeolites". Sometimes, the term "zeolite" is used to refer exclusively to aluminosilicate materials, excluding aluminum-free zeolites or all-silica zeolites.

In some embodiments, the zeolitic material has a three-dimensional framework that is at least one zeolite framework selected from the group consisting of a 4-membered ring zeolite framework, a 6-membered ring zeolite framework, a 10-membered ring zeolite framework, and a 12-membered ring zeolite framework. The zeolite may have a natrolite framework (e.g. gonnardite, natrolite, mesolite, paranatrolite, scolecite, and tetranatrolite), edingtonite framework (e.g. edingtonite and kalborsite), thomsonite framework, analcime framework (e.g. analcime, leucite, pollucite, and wairakite), phillipsite framework (e.g. harmotome), gismondine framework (e.g. amicite, gismondine, garronite, and gobbinsite), chabazite framework (e.g. chabazite-series, herschelite, willhendersonite, and SSZ-13), faujasite framework (e.g. faujasite-series, Linde type X, and Linde type Y), mordenite framework (e.g. maricopaite and mordenite), heulandite framework (e.g. clinoptilolite and heulandite-series), stilbite framework (e.g. barrerite, stellerite, and stilbite-series), brewsterite framework, or cowlesite framework. In some embodiments, the porous silicate and/or aluminosilicate matrix is a zeolitic material having a zeolite framework selected from the group consisting of ZSM-5, ZSM-8, ZSM-11, ZSM-12, ZSM-18, ZSM-23, ZSM-35 and ZSM-39.

In some embodiments, the porous silicate and/or aluminosilicate matrix is surface modified prior to use in the nanocarrier. Such surface modifications may change the surface properties of the porous silicate and/or aluminosilicate matrix, for example by increasing or decreasing the number or concentration of functional groups found on an unmodified porous silicate and/or aluminosilicate matrix or by introducing new functional groups to the porous silicate and/or aluminosilicate matrix. Examples of such new functional groups include, but are not limited to carboxylic acid or carboxylate groups, amine or ammonium groups, sulfo groups, and phosphate groups. Such functional groups may be charged or uncharged. In some embodiments, the surface modification changes the surface charge of the interior surface, the exterior surface, the pore surface, or any combination thereof of the modified porous silicate and/or aluminosilicate matrix compared to unmodified porous silicate and/or aluminosilicate matrix. Preferably, the surface modification does not change the surface charge of the interior surface, exterior surface, pore surface, or any combination thereof of the modified porous silicate and/or aluminosilicate matrix compared to unmodified porous silicate and/or aluminosilicate matrix. Such surface modification may be performed using any suitable method or with any suitable surface modifying agent or agents known to one of ordinary skill in the art. One example of such a method is the use of silanes or organosilicates bearing one or more functional groups to be added by the surface modification. Such surface modification may result in said functional groups being attached to the porous silicate and/or aluminosilicate matrix by covalent bonds. Alternatively, said functional groups may be attached to the porous silicate and/or aluminosilicate matrix by a non-covalent interaction, for example electrostatic interaction, physisorption, or hydrogen bonding. In some embodiments, the surface modifying agent(s) are substantially free of silanes. In some embodiments, the surface modifying agent(s) are substantially free of organosilicates. In some embodiments, the surface modifying agent(s) are substantially free of amino acids. In some embodiments, the surface modifying agent(s) are substantially free of short peptides (i.e. 2-20 residues). In some embodiments, the surface modifying agent(s) are substantially free of chromium salts (chrome alum, chromium acetate, etc.); calcium salts (calcium chloride, calcium hydroxide, etc.); aluminum salts (aluminum chloride, aluminumhydroxide, etc.); dialdehydes (glutaraldehyde, etc.); carbodiimides (EDC, WSC, N-hydroxy-5-norbomene-2,3-di-carboxylmide (HONB), N-hydroxysuccinic acid imide (HOSu), dicyclohexylcarbodiimide (DCC), etc.); N-hydroxysuccinimide; and/or phosphorus oxychloride. In some embodiments, the surface modifying agent(s) are substantially free of proteins. Examples of such proteins include, but are not limited to collagen, gelatin, albumin, ovalbumin, casein, transferrin, fibrin, and fibrinogen.

In general, the carbon nanomaterial may be any suitable carbon nanomaterial known to one of ordinary skill in the art. Examples of carbon nanomaterials include carbon nanotubes, carbon nanobuds, carbon nanoscrolls, carbon dots, activated carbon, carbon black, graphene, graphene oxide, reduced graphene oxide, and nanodiamonds. In some embodiments, the carbon nanomaterial is at least one selected from the group consisting of graphene, graphene oxide, reduced graphene oxide, carbon nanotubes, carbon dots, and activated carbon.

In some embodiments, the carbon nanomaterial is carbon nanotubes. The carbon nanotubes may, in general, be any suitable carbon nanotubes known to one of ordinary skill in the art. Carbon nanotubes may be classified by structural properties such as the number of walls or the geometric configuration of the atoms that make up the nanotube. Classified by their number of walls, the carbon nanotubes can be single-walled carbon nanotubes (SWCNT) which have only one layer of carbon atoms arranged into a tube, or multi-walled carbon nanotubes (MWCNT), which have more than one single-layer tube of carbon atoms arranged so as to be nested, one tube inside another, each tube sharing a common orientation. Closely related to MWNTs are carbon nanoscrolls. Carbon nanoscrolls are structures similar in shape to a MWCNT, but made of a single layer of carbon atoms that has been rolled onto itself to form a multi-layered tube with a free outer edge on the exterior of the nanoscroll and a free inner edge on the interior of the scroll and open ends. The end-on view of a carbon nanoscroll has a spiral-like shape. For the purposes of this disclosure, carbon nanoscrolls are considered a type of MWCNT. Classified by the geometric configuration of the atoms that make up the nanotube, carbon nanotubes can be described by a pair of integer indices n and m. The indices n and m denote the number of unit vectors along two directions in the honeycomb crystal lattice of a single layer of carbon atoms. If m=0, the nanotubes are called zigzag type nanotubes. If n=m, the nanotubes are called armchair type nanotubes. Otherwise they are called chiral type nanotubes. In some embodiments, the carbon nanotubes are metallic. In other embodiments, the carbon nanotubes are semiconducting. In some embodiments, the carbon nanotubes are SWCNTs. In other embodiments, the carbon nanotubes are MWCNTs. In some embodiments, the carbon nanotubes are carbon nanoscrolls. In some embodiments, the carbon nanotubes are zigzag type nanotubes. In alternative embodiments, the carbon nanotubes are armchair type nanotubes. In other embodiments, the carbon nanotubes are chiral type nanotubes.

In some embodiments, the carbon nanomaterial is graphene. In some embodiments, the carbon nanomaterial is graphene nanosheets. Graphene nanosheets may consist of stacks of graphene sheets, the stacks having an average thickness and a diameter. In some embodiments, the stacks comprise 1 to 60 sheets of graphene, preferably 2 to 55 sheets of graphene, preferably 3 to 50 sheets of graphene.

In some embodiments, the graphene is in the form of graphene particles. The graphene particles may have a spherical shape, or may be shaped like blocks, flakes, ribbons, discs, granules, platelets, angular chunks, rectangular prisms, or some other shape. In some embodiments, the graphene particles may be substantially spherical, meaning that the distance from the graphene particle centroid (center of mass) to anywhere on the graphene outer surface varies by less than 30%, preferably by less than 20%, more preferably by less than 10% of the average distance. In some embodiments, the graphene particles may be in the form of agglomerates.

In some embodiments, the graphene is pristine graphene. Pristine graphene refers to graphene that has not been oxidized or otherwise functionalized. Pristine graphene may be obtained by methods such as exfoliation, chemical vapor deposition synthesis, opening of carbon nanotubes, unrolling of carbon nanoscrolls, and the like. In alternative embodiments, the graphene is functionalized graphene. Functionalized graphene is distinguished from pristine graphene by the presence of functional groups on the surface or edge of the graphene that contain elements other than carbon and hydrogen. In other alternative embodiments, the graphene is graphene oxide. Graphene oxide refers to graphene that has various oxygen-containing functionalities that are not present in pristine graphene. Examples of such oxygen-containing functionalities include epoxides, carbonyl, carboxyl, and hydroxyl functional groups. Graphene oxide is sometimes considered to be a type of functionalized graphene.

In other alternative embodiments, the graphene is reduced graphene oxide. Reduced graphene oxide (rGO) refers to graphene oxide that has been chemically reduced. It is distinct from graphene oxide in it contains substantially fewer oxygen-containing functionalities compared to graphene oxide, and it is distinct from pristine graphene by the presence of oxygen-containing functionalities and structural defects in the carbon network. Reduced graphene oxide is sometimes considered to be a type of functionalized graphene. In preferred embodiments, the carbon nanomaterial is reduced graphene oxide. The reduced graphene oxide may exist as nanosheets, particles having a spherical shape, or may be shaped like blocks, flakes, ribbons, discs, granules, platelets, angular chunks, rectangular prisms, or some other shape as described above, agglomerates as described above, or any other shape known to one of ordinary skill in the art.

In some embodiments, the carbon nanoparticles are activated carbon. Activated carbon refers to a form of porous carbon having a semi-crystalline, semi-graphitic structure and a large surface area. Activated carbon may be in the form of particles or particulate aggregates having micropores and/or mesopores. Activated carbon typically has a surface area of approximately 500 to 5000 $m^2/g$. The activated carbon particles may have a spherical shape, or may be shaped like sheets, blocks, flakes, ribbons, discs, granules, platelets, angular chunks, rectangular prisms, or some other shape. In some embodiments, the activated carbon particles may be substantially spherical, meaning that the distance from the activated carbon particle centroid (center of mass) to anywhere on the activated carbon particle outer surface varies by less than 30%, preferably by less than 20%, more preferably by less than 10% of the average distance.

In some embodiments, the carbon nanoparticles are carbon black. Carbon black refers to having a semi-crystalline, semi-graphitic structure and a large surface area. Carbon black may be distinguished from activated carbon by a comparatively lower surface area, typically 15 to 500 m²/g for carbon black. Additionally, carbon black may lack the requisite micropores and mesopores of activated carbon. The carbon black particles may have a spherical shape, or may be shaped like sheets, blocks, flakes, ribbons, discs, granules, platelets, angular chunks, rectangular prisms, or some other shape.

In some embodiments, the particles of a carbon nanomaterial are a single type of particle as described above. In this context, "a single type of particle" may refer to particles of a single carbon nanomaterial, particles which have substantially the same shape, particles which have substantially the same size, or any combination of these. In alternative embodiments, mixtures of types of particles are used.

The International Union of Pure and Applied Chemistry (IUPAC) states that a metal organic framework (MOF) is a coordination network with organic ligands containing potential voids. A coordination network is a coordination compound extending, through repeating coordination entities, in one dimension, but with cross-links between two or more individual chains, loops, or spiro-links, or a coordination compound extending through repeating coordination entities in two or three dimensions; and finally a coordination polymer is a coordination compound with repeating coordination entities extending in one, two, or three dimensions. A coordination entity is an ion or neutral molecule that is composed of a central atom, usually that of a metal, to which is attached a surrounding array of atoms or groups of atoms, each of which is called ligands. More succinctly, a metal organic framework is characterized by metal ions or clusters coordinated to organic ligands to form one-, two-, or three-dimensional structures. Typically, a MOF exhibits a regular void or pore structure. The nature of the void or pore structure, including properties or structural factors such as the geometry about the metal ions or clusters, the arrangement of the linkages between metal ions or clusters, and the number, identity, and spatial arrangement of voids or pores. These properties may be described as the structure of the repeat units and the nature of the arrangement of the repeat units. The specific structure of the MOF, which may include the void or pore structure is typically referred to as the MOF topology.

The metal-organic framework comprises a metal ion which is an ion of at least one metal selected from the group consisting of a transition metal (e.g. Sc, Ti, V, Cr, Mn, Fe, Co, Ni, Cu, Y, Zr, Nb, Mo, Tc, Ru, Rh, Pd, Ag, Hf, Ta, W, Re, Os, Ir, Pt, Au, Rf, Db, Sg, Bh, Hs, Mt, Ds, Rg, and Cn), a post-transition metal (e.g. Al, In, Ga, Sn, Bi, Pb, Tl, Zn, Cd, and Hg), and an alkaline earth metal (e.g. Be, Mg, Ca, Sr, Ba, and Ra). Further, these metal ions may be of any oxidation state $M^{+1}$, $M^{+2}$, $M^{+3}$, etc. In one or more embodiments, the metal ion is an ion of at least one metal selected from the group consisting of Zn, Cu, Fe, Ni, Co, Mn, Cr, Cd, Mg, Ca, and Zr.

In the formation of a metal organic framework, the organic ligands must meet certain requirements to form coordination bonds, primarily being multi-dentate, having at least two donor atoms (i.e. N-, and/or O-) and being neutral or anionic. The structure of the metal organic framework is also affected by the shape, length, and functional groups present in the organic linker. In certain embodiments, the metal organic framework of the present disclosure comprises anionic ligands as organic ligands. In one or more embodiments, the organic ligands may have at least two nitrogen donor atoms. For example, the organic ligands may be imidazolate-based, imidazole-derived or ligands similar to an imidazole including, but not limited to, optionally substituted imidazoles, optionally substituted benzimidazoles, optionally substituted imidazolines, optionally substituted pyrazoles, optionally substituted thiazoles, and optionally substituted triazoles. In a preferred embodiment, the metal organic framework of the present disclosure in any of its embodiments comprises 2-methylimidazole and 5-methylbenzimidazole as the organic ligands. 2-Methylimidazole and 5-methylbenzimidazole organic ligands have free nitrogen atoms that may each form a coordinative bond to the metal ions (e.g. Zn(II)) to produce a coordination network.

In one or more embodiments, the ligand comprises an imidazole of formula (I) and a benzimidazole of formula (II):

(I)

(II)

wherein $R_1$, $R_2$, $R_3$, $R_4$, $R_5$, $R_6$, $R_7$, and $R_8$ are each independently selected from the group consisting of a hydrogen, an optionally substituted alkyl, an optionally substituted cycloalkyl, an optionally substituted alkoxy, a hydroxyl, a halogen, a nitro, and a cyano. Preferably, $R_1$, $R_2$, $R_3$, $R_4$, $R_5$, $R_6$, $R_7$, and $R_8$ are each independently a hydrogen, an optionally substituted $C_1$-$C_3$ alkyl group, or an optionally substituted $C_3$-$C_6$ cycloalkyl group. More preferably, $R_1$, $R_2$, $R_3$, $R_4$, $R_5$, $R_6$, $R_7$, and $R_8$ are each independently a hydrogen or a methyl.

Exemplary imidazole-based ligands that may be applicable to the current disclosure include, but are not limited to, imidazole, 2-methylimidazole, 4-methylimidazole, 2-ethylimidazole, 2-isopropylimidazole, 4-tert-butyl-1H-imidazole, 2-ethyl-4-methylimidazole, 2-bromo-1H-imidazole, 4-bromo-1H-imidazole, 2-chloro-1H-imidazole, 2-iodoimidazole, 2-nitroimidazole, 4-nitroimidazole, (1H-imidazol-2-yl)methanol, 4-(hydroxymethyl)imidazole, 2-aminoimidazole, 4-(trifluoromethyl)-1H-imidazole, 4-cyanoimidazole, 3H-imidazole carboxylic acid, 4-imidazolecarboxylic acid, imidazole-2-carboxylic acid, 2-hydroxy-1H-imidazole-4-carboxylic acid, 4,5-imidazoledicarboxylic acid, 5-iodo-2-methyl-1H-imidazole, 2-methyl-4-nitroimidazole, 2-(aminomethyl)imidazole, 4,5-dicyanoimidazole, 4-imidazoleacetic acid, 4-methyl-5-imidazolemethanol, 1-(4-methyl-1H-imidazol-5-yl)methanamine, 4-imidazoleacrylic acid, 5-bromo-2-propyl-1H-imidazole, ethyl-(1H-imidazol-2-ylmethyl)-amine, and 2-butyl-5-hydroxymethylimidazole. In preferred embodiments, the imidazole of formula (I) is 2-methylimidazole.

Exemplary benzimidazole-based ligands that may be applicable to the current disclosure include, but are not limited to, benzimidazole, 5-methylbenzimidazole, 2-methylbenzimidazole, 5-chlorobenzimidazole, 5-bromobenzimidazole, 5,6-dimethylbenzimidazole, 5-methoxybenzimidazole, 2-chlorobenzimidazole, 2-bromo-1H-benzimidazole, 6-bromo-1H-benzimidazole, 5-fluoro-1H-benzimidazole, 5-chloro-2-methylbenzimidazole, methyl benzimidazole-2-acetate, 1H-benzoimidazol-4-ol, 1H-benzimidazol-5-yl-methanol, 2-benzimidazolemethanol, 4-chloro-6-(trifluoromethyl)benzimidazole, 5-chloro-2-(trichloromethyl) benzimidazole, 5-cyanobenzimidazole, (2-benzimidazolyl) acetonitrile, (5-chloro-1H-benzimidazol-2-yl)methanol, 2-(chloromethyl)benzimidazole, 5-iodo-2-methylbenzimidazole, (5-chloro-1H-benzimidazol-2-yl)methylamine, 2-(aminomethyl)benzimidazole, 2-(6-chloro-1H-benzimidazol-2-yl)ethanol, 2-(1H-benzoimidazol-2-yl)-acetamide, (6-methoxy-1H-benzimidazol-2-yl)methanol, 5,6-dimethoxybenzimidazole, 2-(1H-benzoimidazol-2-yl)-ethylamine, 1-(5-methyl-1H-benzimidazol-2-yl)methanamine, 1-(5-methyl-1H-benzimidazol-2-yl)ethanamine, 2-benzimidazolepropionic acid, 2-(5-methyl-1H-benzimidazol-2-yl)ethanamine, 2-(3-hydroxy-N-propyl)-5-(trifluoromethyl)-benzimidazole, and N-methyl-1-(5-methyl-1H-benzimidazol-2-yl)methanamine. In preferred embodiments, the benzimidazole of formula (II) is 5-methylbenzimidazole.

In one or more embodiments, a molar ratio between the imidazole of formula (I) to the benzimidazole of formula (II) ranges from 1:1 to 1:4, preferably 2:3 to 2:7, more preferably 4:7 to 1:3, even more preferably 5:9 to 2:5, or about 1:2.

Metal organic frameworks comprising such imidazole or benzimidazole ligands are typically referred to as zeolitic imidazolate frameworks (ZIFs). In some embodiments, the metal organic framework is a zeolitic imidazolate framework. Examples of suitable metal organic frameworks include, but are not limited to isoreticular metal organic framework-3 (IRMOF-3), MOF-69A, MOF-69B, MOF-69C, MOF-70, MOF-71, MOF-73, MOF-74, MOF-75, MOF-76, MOF-77, MOF-78, MOF-79, MOF-80, DMOF-1-NH2, UMCM-1-NH2, MOF-69-80, ZIF-1, ZIF-2, ZIF-3, ZIF-4, ZIF-5, ZIF-6, ZIF-7, ZIF-9, ZIF-10, ZIF-11, ZIF-12, ZIF-14, ZIF-20, ZIF-21, ZIF-22, ZIF-23, ZIF-25, ZIF-60, ZIF-61, ZIF-62, ZIF-63, ZIF-64, ZIF-65, ZIF-66, ZIF-67, ZIF-68, ZIF-69, ZIF-70, ZIF-71, ZIF-72, ZIF-73, ZIF-74, ZIF-75, ZIF-76, ZIF-77, ZIF-78, ZIF-79, ZIF-80, ZIF-81, ZIF-82, ZIF-90, ZIF-91, ZIF-92, ZIF-93, ZIF-94, ZIF-96, ZIF-97, ZIF-100, ZIF-108, ZIF-303, ZIF-360, ZIF-365, ZIF-376, ZIF-386, ZIF-408, ZIF-410, ZIF-412, ZIF-413, ZIF-414, ZIF-486, ZIF-516, ZIF-586, ZIF-615, and ZIF-725.

In some embodiments, the porous support is aluminum oxide. In some embodiments, the aluminum oxide is gamma (γ) aluminum oxide.

In some embodiments, the porous support is present in the form of particles. In general, the porous support particles can be any shape known to one of ordinary skill in the art. Examples of suitable shapes the metal organic framework particles may take include spheres, spheroids, lentoids, ovoids, solid polyhedra such as tetrahedra, cubes, octahedra, icosahedra, dodecahedra, rectangular prisms, triangular prisms (also known as nanotriangles), nanoplatelets, nanodisks, nanotubes, blocks, flakes, discs, granules, angular chunks, and mixtures thereof.

In some embodiments, the porous support particles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of me porous support particles having a different shape. As used herein, the term "non-uniform shape" refers to an average consistent shape that differs by more than 10% of the distribution of porous support particles having a different shape. In one embodiment, the shape is uniform and at least 90% of the porous support particles are spherical or substantially circular, and less than 10% are polygonal. In another embodiment, the shape is non-uniform and less than 90% of the porous support particles are spherical or substantially circular, and greater than 10% are polygonal.

In some embodiment, the porous support is in the form of particles having a mean particle size of 100 to 10,000 nm, preferably 125 to 9,500 nm, preferably 150 to 9,000 nm, preferably 175 to 8,500 nm preferably 200 to 8,000 nm, preferably 250 to 7,500 nm. In embodiments where the porous support particles are spherical, the particle size may refer to a particle diameter. In embodiments where the porous support particles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the porous support particles have an anisotropic shape such as nanorods or nanotubes, the particle size may refer to a length of the nanorod or nanotube, a width of the nanorod or nanotube, or an average of the length and width of the nanorod or nanotube. In some embodiments, the particle size refers to the diameter of a sphere having an equivalent volume as the particle.

The hydrogen sulfide scavenger comprises particles of the manganese oxide. These particles of manganese oxide are disposed on at least one selected from an exterior surface of the porous support and within pores of the porous support. The particles of manganese oxide (manganese oxide particles) can comprise any suitable manganese oxide or combination of manganese oxides. Various manganese oxides are known, examples of which include but are not limited to $MnO$, $Mn_3O_4$, $Mn_2O_3$, $MnO_2$, $MnO_3$, $Mn_2O_7$, $Mn_5O_8$, $Mn_7O_{12}$ and $Mn_7O_{13}$. Manganese oxide particles may contain a single type of manganese oxide or may contain more than one type of manganese oxide. Multiple types of manganese oxide particles may be used, which differ in various properties such as identity of composition of manganese oxides, size, shape, or other similar property. In general, the manganese oxide particles may have any suitable shape as described above. The shape may be uniform or non-uniform. In some embodiments, the manganese oxide particles have a mean particle size of 5 to 150 nm, preferably 7.5 to 125 nm, preferably 10 to 100 nm.

In some embodiments, the hydrogen sulfide scavenger has a molar ratio of manganese to aluminum of 1:1 to 1:5, preferably 1:2 to 1:4.5, preferably 1:3 to 1:4.25, preferably 1:4.

In some embodiments, the hydrogen sulfide scavenger is present in the drilling fluid in an amount of 0.01 to 10 wt. %, preferably 0.05 to 9 wt. %, preferably 0.075 to 8.5 wt. %, preferably 0.1 to 8 wt. %, preferably 0.125 to 7.5 wt. %, preferably 0.15 to 7 wt. %, preferably 0.175 to 6.5 wt %, preferably 0.2 to 6 wt %., based on the total weight of the drilling fluid.

In some embodiments, the drilling fluid further comprises a weighting agent. Examples of weighting agents include but are not limited to, calcium carbonate, sodium sulfate, hematite, siderite, ilmenite, and hydrophobic zinc nanoparticles. The weighting agent is an agent that increases an overall density of the drilling fluid in order to provide sufficient bottom-hole pressure to prevent an unwanted influx of formation fluids. In some embodiments, the drilling fluid includes 1 to 3 wt. % preferably 1.25 to 2.75 wt. %, preferably 1.5 to 2.5 wt. %, preferably 1.75 to 2.25 wt. %, preferably 1.9 to 2.1 wt. %, preferably 2.0 wt. % of the weighting agent, based on the total weight of the drilling fluid. In some embodiments, the weighting agent is hydrophobic metallic zinc nanoparticles including a metallic core and organic ligands present on a surface of the metallic core.

In general, the organic ligands may be any suitable organic ligands known to one of ordinary skill in the art. Examples of such organic ligands include, but are not limited to carboxylates (often referred to by their acid forms) such as citrate (citric acid), oleate (oleic acid), amines such as oleylamine, hexadecylamine, octadecylamine, and 1,6-diaminohexane; thiols such as decanethiol, dodecanethiol, octadecanethiol, and thiol-terminated polyethylene glycol (PEG-SH); lipids, proteins such as albumin, ovalbumin, thrombin, and lactoglobulin, polysaccharides such as chitosan and dextran; phosphines such as trioctylphosphine, trioctylphosphine oxide, and triphenylphosphine; and surfactants such as cetyltrimethylammonium bromide (CTAB). For examples of organic ligands (also called capping ligands or capping agents), see Javed, et. al., Kobayashi, et. al., and Guerrini, et. al. [Javed, R., et. al., Journal of Nanobiotechnology, 2020, 18, article number 172; Kobayashi, K., et. al., Polymer Journal, 2014, 46, 460-468; and Guerrini, L., et. al., Materials, 2018, 11, 1154].

In some embodiments, the organic ligands act as surface ligands by binding non-oxidatively to a surface of the hydrophobic metallic zinc nanoparticles. Such non-oxidative binding may occur through, for example, non-deprotonated alcohol, ether, amine, amide, carboxyl, carbonyl, thiol, disulfide, ester, or other functional group acting as an "L-type" ligand and/or physisorption, This binding is distinct from oxidative binding seen in, for example, carboxylates, alkoxides, hydroxide ions or halides, which may act as "X-type" ligands. The non-oxidative binding may occur through metal-ligand coordination type interactions between appropriate functional groups on the extract phytochemicals. The alcohol groups should exist in alcohol form, that is, bearing the hydroxyl proton. Such a form is distinct from the deprotonated alkoxide form. Additionally, there may be non-chemical interactions which cause physisorption of the organic ligands to the surface of the hydrophobic metallic zinc nanoparticle. Examples of such non-chemical interactions include electrostatic interactions such as ion (or charged species in general)-ion interactions, ion-dipole interactions, or dipole-dipole interactions; and Van der Waals interactions. While the surface of the hydrophobic metallic zinc nanoparticle may have a charge, the organic ligands may be present in either charged or uncharged form. The binding of the organic ligands may also occur ionically or oxidatively. Such oxidative binding may occur, for example, through or involving the formation of, surface iron atoms formally in the +2 oxidation state but which are not fully incorporated into the metallic zinc core which may be present on the surface of the hydrophobic metallic zinc nanoparticle or through a ligand which is acting as an "X-type" ligand. An example of such oxidative binding is through a thiolate, alkoxide, or amide ion (a deprotonated amine derivative not to be confused with the organic functional group commonly depicted as —C(O)NR$_2$). In such a situation, preferably the positive charge on the zinc ion is balanced by an equal amount of negative charge(s) present on organic ligands such that overall, the hydrophobic metallic zinc nanoparticles do not have a net charge. In some embodiments, the organic ligands comprise a thiol functional group. This thiol functional group may interact with the surface of the metallic core as at least one selected from the group consisting of thiol and thiolate functional groups.

In some embodiments, the hydrophobic metallic zinc nanoparticles have a coating. Examples of materials which may comprise the coating include, but are not limited to silica, lipids, polymers, and carbon nanomaterials. In general, the polymer may be any suitable polymer known to one or ordinary skill in the art. Examples of such suitable polymer include, but are not limited to polycarboxylic acid polymers and copolymers including polyacrylic acids; acetal polymers and copolymers; acrylate and methacrylate polymers and copolymers (e.g., n-butyl methacrylate); cellulosic polymers and copolymers, including cellulose acetates, cellulose nitrates, cellulose propionates, cellulose acetate butyrates, cellophanes, rayons, rayon triacetates, and cellulose ethers such as carboxymethyl celluloses and hydoxyalkyl celluloses; polyoxymethylene polymers and copolymers; polyimide polymers and copolymers such as polyether block imides, polyamidimides, polyesterimides, and polyetherimides; polysulfone polymers and copolymers including polyarylsulfones and polyethersulfones; polyamide polymers and copolymers including nylon 6,6, nylon 12, polycaprolactams and polyacrylamides; resins including alkyd resins, phenolic resins, urea resins, melamine resins, epoxy resins, allyl resins and epoxide resins; polycarbonates; polyacrylonitriles; polyvinylpyrrolidones (crosslinked and otherwise); polymers and copolymers of vinyl monomers including polyvinyl alcohols, polyvinyl halides such as polyvinyl chlorides, ethylene-vinylacetate copolymers (EVA), polyvinylidene chlorides, polyvinyl ethers such as polyvinyl methyl ethers, polystyrenes, styrene-maleic anhydride copolymers, styrene-butadiene copolymers, styrene-ethylene-butylene copolymers (e.g., a polystyrenepolyethylene/butylene-polystyrene (SEBS) copolymer, available as Kraton® G series polymers), styrene-isoprene copolymers (e.g., polystyrene-polyisoprene-polystyrene), acrylonitrile-styrene copolymers, acrylonitrile-butadiene-styrene copolymers, styrene-butadiene copolymers and styrene-isobutylene copolymers (e.g., polyisobutylene-polystyrene block copolymers such as SIBS), polyvinyl ketones, polyvinylcarbazoles, and polyvinyl esters such as polyvinyl acetates; polybenzimidazoles; ionomers; polyalkyl oxide polymers and copolymers including polyethylene oxides (PEO); glycosaminoglycans; polyesters including polyethylene terephthalates and aliphatic polyesters such as polymers and copolymers of lactide (which includes lactic acid as well as d-, I- and mesa lactide), epsilon-caprolactone, glycolide (including glycolic acid), hydroxybutyrate, hydroxyvalerate, para-dioxanone, trimethylene carbonate (and its alkyl derivatives), 1,4-dioxepan-2-one, 1,5-dioxepan-2-one, and 6,6-dimethyl-1,4-dioxan-2-one (a copolymer of polylactic acid and polycaprolactone is one specific example); polyether polymers and copolymers including polyarylethers such as polyphenylene ethers, polyether ketones, polyether ether ketones; polyphenylene sulfides; polyisocyanates; polyolefin polymers and copolymers, including polyalkylenes such as polypropylenes, polyethylenes (low and high density, low and high molecular weight), polybutylenes (such as polybut-1-ene and polyisobutylene), poly-4-methyl-pen-1-enes, ethylene-alpha-olefin copolymers, ethylene-methyl methacrylate copolymers and ethylene-vinyl acetate copolymers; polyolefin elastomers (e.g., santoprene), ethylene propylene diene monomer (EPDM) rubbers, fluorinated polymers and copolymers, including polytetrafluoroethylenes (PTFE), poly(tetrafluoroethylene-co-hexafluoropropene) (FEP), modified ethylene-tetrafluoroethylene copolymers (ETFE), and polyvinylidene fluorides (PVDF); silicone polymers and copolymers; polyurethanes; p-xylylene polymers; polyiminocarbonates; copoly(ether-esters) such as polyethylene oxide-polylactic acid copolymers; polyphosphazines; polyalkylene oxalates; polyoxaamides and polyoxaesters (including those containing amines and/or amido groups); polyorthoesters; biopolymers, such as polypeptides, proteins, polysaccharides and fatty acids (and esters thereof), including fibrin, fibrinogen, collagen, elastin, chitosan, gelatin, starch, glycosaminoglycans such as hyaluronic acid; as well as blends and further copolymers of the above.

In general, the hydrophobic metallic zinc nanoparticles can be any shape known to one of ordinary skill in the art. Examples of suitable shapes the hydrophobic metallic zinc nanoparticles may take include spheres, spheroids, lentoids, ovoids, solid polyhedra such as tetrahedra, cubes, octahedra, icosahedra, dodecahedra, hollow polyhedral (also known as nanocages), stellated polyhedral (both regular and irregular, also known as nanostars), triangular prisms (also known as nanotriangles), hollow spherical shells (also known as nanoshells), tubes (also known as nanotubes), nanosheets, nanoplatelets, nanodisks, rods (also known as nanorods), and mixtures thereof. In the case of nanorods, the rod shape may be defined by a ratio of a rod length to a rod width, the ratio being known as the aspect ratio. For hydrophobic metallic zinc nanoparticles of the current invention, nanorods should have an aspect ratio less than 1000, preferably less than 750, preferably less than 500, preferably less than 250, preferably less than 100, preferably less than 75, preferably less than 50, preferably less than 25. Nanorods having an aspect ratio greater than 1000 are typically referred to as nanowires and are not a shape that the hydrophobic metallic zinc nanoparticles are envisioned as having in any embodiments.

In some embodiments, the hydrophobic metallic zinc nanoparticles have uniform shape. Alternatively, the shape may be non-uniform. As used herein, the term "uniform shape" refers to an average consistent shape that differs by no more than 10%, by no more than 5%, by no more than 4%, by no more than 3%, by no more than 2%, by no more than 1% of the distribution of hydrophobic metallic zinc nanoparticles having a different shape. As used herein, the term "non-uniform shape" refers to an average consistent shape that differs by more than 10% of the distribution of hydrophobic metallic zinc nanoparticles having a different shape. In one embodiment, the shape is uniform and at least 90% of the hydrophobic metallic zinc nanoparticles are spherical or substantially circular, and less than 10% are polygonal. In another embodiment, the shape is non-uniform and less than 90% of the hydrophobic metallic zinc nanoparticles are spherical or substantially circular, and greater than 10% are polygonal.

In some embodiments, the hydrophobic metallic zinc nanoparticles have a mean particle size of 5 to 500 nm, preferably 7.5 to 475 nm, preferably 10 to 460 nm, preferably 12.5 to 450 nm, preferably 15 to 400 nm, preferably 15.5 to 350 nm, preferably about 16 to 325 nm. In embodiments where the hydrophobic metallic zinc nanoparticles are spherical, the particle size may refer to a particle diameter. In embodiments where the hydrophobic metallic zinc nanoparticles are polyhedral, the particle size may refer to the diameter of a circumsphere. In some embodiments, the particle size refers to a mean distance from a particle surface to particle centroid or center of mass. In alternative embodiments, the particle size refers to a maximum distance from a particle surface to a particle centroid or center of mass. In some embodiments where the hydrophobic metallic zinc nanoparticles have an anisotropic shape such as nanorods, the particle size may refer to a length of the nanorod, a width of the nanorod, an average of the length and width of the nanorod. In some embodiments in which the hydrophobic metallic zinc nanoparticles have non-spherical shapes, the particle size refers to the diameter of a sphere having an equivalent volume as the particle. In some embodiments in which the hydrophobic metallic zinc nanoparticles have non-spherical shapes, the particle size refers to the diameter of a sphere having an equivalent diffusion coefficient as the particle.

In some embodiments, the hydrophobic metallic zinc nanoparticles of the present disclosure are monodisperse, having a coefficient of variation or relative standard deviation, expressed as a percentage and defined as the ratio of the particle size standard deviation ($\sigma$) to the particle size mean ($\mu$) multiplied by 100 of less than 25%, preferably less than 10%, preferably less than 8%, preferably less than 6%, preferably less than 5%, preferably less than 4%, preferably less than 3%, preferably less than 2%. In some embodiments, the hydrophobic metallic zinc nanoparticles of the present disclosure are monodisperse having a particle size distribution ranging from 80% of the average particle size to 120% of the average particle size, preferably 90-110%, preferably 95-105% of the average particle size. In some embodiments, the hydrophobic metallic zinc nanoparticles are not monodisperse.

In general, the particle size may be determined by any suitable method known to one of ordinary skill in the art. In some embodiments, the particle size is determined by powder X-ray diffraction (PXRD). Using PXRD, the particle size may be determined using the Scherrer equation, which relates the full-width at half-maximum (FWHM) of diffraction peaks to the size of regions comprised of a single crystalline domain (known as crystallites) in the sample. In some embodiments, the crystallite size is the same as the particle size. For accurate particle size measurement by PXRD, the particles should be crystalline, comprise only a single crystal, and lack non-crystalline portions. Typically, the crystallite size underestimates particle size compared to other measures due to factors such as amorphous regions of particles, the inclusion of non-crystalline material on the surface of particles such as bulky surface ligands, and particles which may be composed of multiple crystalline domains. In some embodiments, the particle size is determined by dynamic light scattering (DLS). DLS is a technique which uses the time-dependent fluctuations in light scattered by particles in suspension or solution in a solvent, typically water to measure a size distribution of the particles. Due to the details of the DLS setup, the technique measures a hydrodynamic diameter of the particles, which is the diameter of a sphere with an equivalent diffusion coefficient as the particles. The hydrodynamic diameter may include factors not accounted for by other methods such as non-crystalline material on the surface of particles such as bulky surface ligands, amorphous regions of particles, and surface ligand-solvent interactions. Further, the hydrodynamic diameter may not accurately account for non-spherical particle shapes. DLS does have an advantage of being able to account for or more accurately model solution or suspension behavior of the particles compared to other techniques. In some embodiments, the particle size is determined by electron microscopy techniques such as scanning electron microscopy (SEM) or transmission electron microscopy (TEM).

In some embodiments, the drilling fluid further comprises a secondary weighting agent. The secondary weighting agent may be any suitable weighting agent described above.

In some embodiments, the drilling fluid comprises a surfactant. In general, the surfactants may be a nonionic surfactant, an anionic surfactant, a cationic surfactant, a viscoelastic surfactant, or a zwitterionic surfactant.

Anionic surfactants contain anionic functional groups at their head, such as sulfate, sulfonate, phosphate, and carboxylate. The anionic surfactant may be an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, a ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Cationic surfactants have cationic functional groups at their head, such as primary and secondary amines. Cationic surfactants include octenidine dihydrochloride; cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Zwitterionic (amphoteric) surfactants have both cationic and anionic groups attached to the same molecule. Zwitterionic surfactants include CHAPS (3-[(3-cholamidopropyl)dimethylammonio]-1-propanesulfonate), cocamidopropyl hydroxysultaine, ocamidopropyl betaine, phospholipids, and sphingomyelins.

Nonionic surfactants have a polar group that does not have a charge. These include long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycols of various molecular weights, polyethylene glycol alkyl ethers having the formula $CH_3$—$(CH_2)_{10-16}$—$(O\text{-}C_2H_4)_{1-25}$-OH, such as octaethylene glycol monododecyl ether and pentaethylene glycol monododecyl ether; polypropylene glycol alkyl ethers having the formula: $CH_3$—$(CH_2)_{10-16}$—$(O\text{-}C_3H_6)_{1-25}$-OH; glucoside alkyl ethers having the formula $CH_3$—$(CH_2)_{10-16}$—$(O\text{-glucoside})_{1-3}$-OH, such as decyl glucoside, lauryl glucoside, octyl glucoside; polyethylene glycol octylphenyl ethers having the formula $C_8H_{17}$—$(C_6H_4)$—$(O$—$C_2H_4)_{1-25}$—OH, such as Triton X-100; polyethylene glycol alkylphenyl ethers having the formula $C_9H_{19}$-$(C_6H_4)$—$(O$—$C_2H_4)_{1-25}$—OH, such as nonoxynol-9; glycerol alkyl esters such as glyceryl laurate; polyoxyethylene glycol sorbitan alkyl esters such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

A dendritic surfactant molecule may include at least two lipophilic chains that have been joined at a hydrophilic center and have a branch-like appearance. In each dendritic surfactant, there may be from about 2 lipophilic moieties independently to about 4 lipophilic moieties attached to each hydrophilic group, or up to about 8 lipophilic moieties attached to the hydrophilic group for example. "Independently" as used herein with respect to ranges means that any lower threshold may be combined with any upper threshold. The dendritic surfactant may have better repulsion effect as a stabilizer at an interface and/or better interaction with a polar oil, as compared with other surfactants. Dendritic surfactant molecules are sometimes called "hyperbranched" molecules.

A dendritic extended surfactant is a dendritic surfactant having a non-ionic spacer arm between the hydrophilic group and a lipophilic tail. For example, the non-ionic spacer-arm extension may be the result of polypropoxylation, polyethoxylation, or a combination of the two with the polypropylene oxide next to the tail and polyethylene oxide next to the head. The spacer arm of a dendritic extended surfactant may contain from about 1 independently to about 20 propoxy moieties and/or from about 0 independently to about 20 ethoxy moieties. Alternatively, the spacer arm may contain from about 2 independently up to about 16 propoxy moieties and/or from about 2 independently up to about 8 ethoxy moieties. "Independently" as used herein with respect to ranges means that any lower threshold may be combined with any upper threshold. The spacer arm extensions may also be formed from other moieties including, but not necessarily limited to, glyceryl, butoxy, glucoside, isosorbide, xylitols, and the like. For example, the spacer arm of a dendritic extended surfactant may contain both propoxy and ethoxy moieties. The polypropoxy portion of the spacer arm may be considered lipophilic; however, the spacer arm may also contain a hydrophilic portion to attach the hydrophilic group. The hydrophilic group may generally be a polyethoxy portion having about two or more ethoxy groups. These portions are generally in blocks, rather than being randomly mixed. Further, the spacer arm extension may be a poly-propylene oxide chain.

Another type of surfactant is a viscoelastic surfactant (VES). Conventional surfactant molecules are characterized by having one long hydrocarbon chain per surfactant headgroup. In a viscoelastic gelled state these molecules aggregate into worm-like micelles. A viscoelastic gel is a gel that has elastic properties, meaning that the gel at least partially returns to its original form when an applied stress is removed. Typical viscoelastic surfactants include N-erucyl-N,N-bis(2-hydroxyethyl)-N-methyl ammonium chloride and potassium oleate, solutions of which form gels when mixed with inorganic salts such as potassium chloride and/or with organic salts such as sodium salicylate. Previously described surfactants may also be considered viscoelastic surfactants.

Another type of surfactant is a rhamnolipid surfactant. Rhamnolipids are a class of glycolipid which comprise a rhamnose glycosyl head group and a fatty acid tail. Typically, the fatty acid tails is a 3-(hydroxyalkanoyloxy)alkanoic acid (HAA), such as 3-hydroxydecanoic acid. Rhamnolipids are typically divided into two main classes based on the number of rhamnose units present in the head group: mono-rhamnolipids, which have one rhamnose group, and di-rhamnolipids, which have two rhamnose groups. Rhamnolipids can act as surfactants. When acting as such, they are typically referred to using the term "rhamnolipid surfactant", which may be a rhamnolipid, a salt, solvate, tautomer, stereoisomer, or complex thereof.

In some embodiments, the drilling fluid includes 2 to 4 wt. %, preferably 2.25 to 3.75 wt. %, preferably 2.5 to 3.5 wt. %, preferably 2.75 to 3.25 wt. %, preferably 2.9 to 3.1 wt. %, preferably 3.0 wt. % of the surfactant, based on a total weight of the drilling fluid.

In some embodiments, the drilling fluid comprises a secondary hydrogen sulfide scavenger. The secondary hydrogen sulfide scavenger may refer to any hydrogen sulfide scavenger which is not the particles of manganese oxide supported on a porous support described above. In some embodiments, the secondary hydrogen sulfide scavenger may include copper compounds such as copper oxide, copper sulfate, copper molybdate, copper hydroxide, copper halide, copper carbonate, copper hydroxy carbonate, copper carboxylate, copper phosphate, copper hydrates and copper derivatives thereof; calcium salts, cobalt salts, nickel salts, lead salts, tin salts, zinc salts, iron salts, manganese salts, zinc oxide, iron oxides, triazine, monoethanolamine, diethanolamine, caustic soda, potassium permanganate, and combinations thereof.

In some embodiments, the secondary hydrogen sulfide scavenger is potassium permanganate. In some embodiments, the potassium permanganate is present in or added to the drilling fluid composition in an encapsulated form. Such an encapsulated form may be characterized by particles or granules of potassium permanganate which are surrounded by a coating of an encapsulating agent. Examples of encapsulating agents include, but are not limited to polymers such as polyvinyl acetate, polyethylene oxide, polycaprolactone, polylactic acid, polymethyl methacrylate, and the like; waxes such as paraffin wax, beeswax, soy wax, carnauba wax, and the like; and mixtures thereof. Removal or degradation (e.g. dissolving) of the encapsulating agent may occur on incorporation or addition to the drilling fluid composition, or on some trigger, such as the introduction of a specific encapsulating agent remover or degrader. This removal or degradation may result in the encapsulating agent being present in the drilling fluid composition. The encapsulating agent may be present in a state such that is no longer forms capsules. In some embodiments, the potassium permanganate is present in or added to the drilling fluid composition in a supported form. Such a supported from may be characterized by particles or granules of potassium permanganate present on the surface of or in pores of a suitable inorganic support. Examples of such inorganic supports include, but are not limited to porous silica and porous alumina. In some embodiments, the particles or granules of potassium permanganate are released from the inorganic support upon addition to or incorporation in the drilling fluid composition. In some embodiments, the particles or granules of potassium permanganate are released from the inorganic support upon addition of specific support release agent. In some embodiments, the particles or granules of potassium permanganate are released upon reaction with hydrogen sulfide. In some embodiments, the particles or granules of potassium permanganate react with hydrogen sulfide without being released from the support. In some embodiments, the potassium permanganate is present in or added to the drilling fluid in the form of a gel. The permanganate, prior to injection into the well, can be mixed as an aqueous solution at high turbulence and shear with an oil phase together in the presence of an excess amount of a viscoelastic surfactant. A preferable surfactant is CTAB modified as a gemini from or two-tailed surfactant molecule, preferably in an amount of 5-25%, 10-20%, or about 15% by weight of the total weight of the composition. When mixed under high shear the permanganate-containing water solution, the oil and the surfactant form a gel or micelle-containing composition. This in turn is injected immediately after formation into the wellbore such that the micelle or gel characteristic of the composition is maintained until the permanganate-containing composition reaches a target location in the wellbore. Preferably the permanganate-containing composition is made continuously during the injection and is injected into the wellbore immediately and continuously while being formed. Encapsulated, supported, or gelled forms of potassium permanganate may be advantageous for storage or for use in the cycling of drilling fluid composition described above. Such forms may further be advantageous for increasing the safety of the drilling fluid composition or the preparation thereof, for example by limiting exposure of workers or other personnel to solid or liquid forms of potassium permanganate capable of harming said personnel.

In some embodiments, concentration of the potassium permanganate may be as high as a solubility limit in the drilling fluid at a given temperature and pressure. The concentration of the potassium permanganate may be adjusted according to hydrogen sulfide amount that may be encountered during a wellbore drilling. The potassium permanganate reacts with the hydrogen sulfide. The drilling fluid is configured to produce upon contact with the hydrogen sulfide, a dispersion of manganese-containing particles such as manganese sulfide and manganese sulfate. In some embodiments, the drilling fluid includes 0.25 to 3.0 wt. %, preferably 0.5 to 2.5 wt. %, preferably 0.75 to 2.25 wt. %, preferably 1.0 to 2.0 wt. %, preferably 1.25 to 1.75 wt. %, preferably 1.4 to 1.6 wt. %, preferably 1.5 wt. % of the secondary hydrogen sulfide scavenger, based on the total weight of the drilling fluid.

In some embodiments, the drilling fluid comprises a viscosifier. The viscosifier is an additive of the drilling fluid composition that increases viscosity of the drilling fluid. In some embodiments, the drilling fluid includes 4 to 6 wt. %, preferably 4.25 to 5.75 wt. %, preferably 4.5 to 5.5 wt. %, preferably 4.75 to 5.25 wt. %, preferably 5 wt. % the viscosifier, based on a total weight of drilling fluid. The term "viscosifier" as used in this disclosure refers to an additive of the drilling fluid composition that increases the viscosity of the drilling fluid. Exemplary viscosifiers include, but are not limited to sodium carbonate (soda ash), bauxite, dolomite, limestone, calcite, vaterite, aragonite, magnesite, taconite, gypsum, quartz, marble, hematite, limonite, magnetite, andesite, garnet, basalt, dacite, nesosilicates or orthosilicates, sorosilicates, cyclosilicates, inosilicates, phyllosilicates, tectosilicates, kaolins, montmorillonite, fullers earth, and halloysite. In some embodiments, the viscosifier may further include a natural polymer such as hydroxyethyl cellulose (HEC), carboxymethylcellulose, polyanionic cellulose (PAC), or a synthetic polymer such as poly(diallyl amine), diallyl ketone, diallyl amine, styryl sulfonate, vinyl lactam, laponite, polygorskites (such as attapulgite, sepiolite), and combinations thereof. In some embodiments, the viscosifier may further include one or more thickening agents such as XC-polymer, xanthan gum, guar gum, glycol, and combinations thereof. In some embodiments, the viscosifier is bentonite. The 'bentonite' may refer to potassium bentonite, sodium bentonite, calcium bentonite, aluminum bentonite, and combinations thereof, depending on the relative amounts of potassium, sodium, calcium, and aluminum in the bentonite. In some embodiments, the viscosifier is a corn starch.

In some embodiments, the drilling fluid comprises at least one fluid loss prevention agent. The term "fluid-loss control agent" as used herein refers to an additive of the drilling fluid composition that controls loss of the drilling fluid when injected into a subterranean geological formation. Exemplary fluid-loss control agents include, but are not limited to, starch, polysaccharides, silica flour, gas bubbles (energized fluid or foam), benzoic acid, soaps, resin particulates, relative permeability modifiers, degradable gel particulates, hydrocarbons dispersed in fluid, and one or more immiscible fluids. In some embodiments, the drilling fluid may include multiple fluid loss prevention agents. In some embodiments, the drilling fluid includes 0.4 to 0.7 wt. %, preferably 0.45 to 0.6 wt. % of the fluid loss prevention agent, based on a total weight of drilling fluid. In some embodiments, the fluid loss prevention agent is at least one selected from the group consisting of the corn starch and poly(vinyl butyral)-co-vinyl alcohol-co-vinyl acetate (PVBA). In some embodiments, the fluid loss prevention agent is a mixture of 85 to 90 wt. % the corn starch and 10 to 15 wt. % the PVBA, each based on a total weight of the mixture.

In some embodiments, the drilling fluid comprises a pH adjusting agent, also referred to as the buffer. The pH adjusting agent is an additive of the drilling fluid composition that adjusts the pH of the drilling fluid composition. The pH adjusting agent includes an alkali metal base. In some embodiments, the drilling fluid includes 0.6 to 1.0 wt. %, preferably 0.65 to 0.95 wt. %, preferably 0.7 to 0.9 wt. % of the pH adjusting agent including the alkali metal base, based on a total weight of drilling fluid. The alkali metal base may be an alkali metal hydroxide, such as potassium hydroxide, lithium hydroxide, rubidium hydroxide and cesium hydroxide. In some embodiments, the alkali metal base is sodium hydroxide. In some embodiments, the pH adjusting agent may include, but is not limited to, monosodium phosphate, disodium phosphate, sodium tripolyphosphate. In some embodiments, the pH of the drilling fluid is acidic or neutral. In some embodiments, the pH of the drilling fluid is basic.

In some embodiments, the drilling fluid comprises a clay stabilizer comprising an alkali metal halide salt. In some embodiments, the drilling fluid comprises 0.25 to 2 wt. %, preferably 0.35 to 1.75, preferably 0.50 to 1.5 wt. %, preferably 0.55 to 1.45 wt. %, preferably 0.60 to 1.40 wt. %, preferably 0.65 to 1.35 wt. %, preferably 0.70 to 1.30 wt. %, preferably 0.75 to 1.25 wt. %, preferably 0.80 to 1.20 wt. %, preferably 0.85 to 1.15 wt. %, preferably 0.90 to 1.10 wt. %, preferably 0.95 to 1.05 wt. %, preferably 1 wt. % a clay stabilizer includes the alkali metal halide salt, based on a total weight of drilling fluid. The clay stabilizer is an additive of the drilling fluid composition that aids in the stabilization of shales and to control swelling clays. In some embodiments, the alkali metal halide salt is potassium chloride. In some embodiments, the alkali metal halide salt may include, but is not limited to, sodium chloride, lithium chloride, rubidium chloride, and cesium chloride. In some embodiments, the clay stabilizer may include an alkaline earth metal halide salt. In some embodiments, the alkaline earth metal halide salt may include, but is not limited to, calcium chloride, and magnesium chloride.

In some embodiments, the drilling fluid comprises 0.05 to 0.5 wt. % a filtration rate agent. The filtration rate agent is an additive for aqueous drilling fluids to reduce the loss of fluids from a mud cake to pores of the formation during drilling of oil and gas wells. In some embodiments, the filtration rate agent is sodium carbonate.

In some embodiments, the drilling fluid further comprises a deflocculant. Deflocculant is an additive of the drilling fluid composition that prevents a colloid from coming out of suspension or slurries. In some embodiments, the defloccu-lant may include, but is not limited to, an anionic polyelectrolyte, for example, acrylates, polyphosphates, ligno-sulfonates (LS), or tannic acid derivatives, for example, quebracho.

In some embodiments, the drilling fluid further comprises a lubricant. In some embodiments, LUBE 1017OB may be used as the lubricant. In some embodiments, the lubricant may include, but is not limited to, polyalpha-olefin (PAO), synthetic esters, polyalkylene glycols (PAG), phosphate esters, alkylated naphthalenes (AN), silicate esters, ionic fluids, and multiply alkylated cyclopentanes (MAC).

In some embodiments, the drilling fluid further comprises a crosslinker. The crosslinker is an additive of the drilling fluid composition that can react with multiple-strand polymers to couple molecules together, thereby creating a highly viscous fluid, with a controllable viscosity. The crosslinker may include, but is not limited to, metallic salts, such as salts of Al, Fe, B, Ti, Cr, and Zr, or organic crosslinkers such as polyethylene amides and formaldehyde.

In some embodiments, the drilling fluid further comprises a breaker. The breaker is an additive of the drilling fluid composition that provides a desired viscosity reduction in a specified period of time. The breaker may include, but is not limited to, oxidizing agents, such as sodium chlorites, sodium bromate, hypochlorites, perborate, persulfates, peroxides, and enzymes. In some embodiments, the drilling fluid further comprises a biocide. The biocide is an additive of the drilling fluid composition that may kill microorganisms present in the drilling fluid composition. The biocide may include, but is not limited to, phenoxyethanol, ethylhexyl glycerine, benzyl alcohol, methyl chloroisothiazolinone, methyl isothiazolinone, methyl paraben, ethyl paraben, propylene glycol, bronopol, benzoic acid, imidazolinidyl urea, 2,2-dibromo-3-nitrilopropionamide, and 2-bromo-2-nitro-1,3-propanedial.

In some embodiments, the drilling fluid further comprises a corrosion inhibiting agent. The corrosion inhibiting agent is a chemical compound that decreases the corrosion rate of a material, more preferably, a metal or an alloy, that comes into contact with the drilling fluid. In some embodiments, the corrosion inhibiting agent may include, but is not limited to, imidazolines, and amido amines. In some embodiments, the corrosion inhibiting agent may include, but is not limited to, oxides, sulfides, halides, nitrates, preferably halides, of metallic elements of group Ma to Via such as $SbBr_3$.

In some embodiments, the drilling fluid further comprises an anti-scaling agent. The anti-scaling agent is an additive of the drilling fluid composition that inhibit the formation and precipitation of crystallized mineral salts that form scale. The anti-scaling agent may include, but is not limited to, phosphonates, acrylic co/ter-polymers, polyacrylic acid (PAA), phosphino poly carboxylic acid (PPCA), phosphate esters, hexamethylene diamine tetrakis (methylene phosphonic acid), diethylene triamine tetra (methylene phosphonic acid), diethylene triamine penta (methylene phosphonic acid) (DETA phosphonate), bis-hexamethylene triamine pentakis (methylene phosphonic acid) (BHMT phosphonate), 1-hydroxyethylidene 1,1-diphosphonate (HEDP phosphonate), and polymers of sulfonic acid on a polycarboxylic acid backbone. In some embodiments, the anti-scaling agent may further include phosphine, sodium hexametaphosphate, sodium tripolyphosphate and other inorganic polyphosphates, hydroxy ethylidene diphosphonic acid, butane-tricarboxylic acid, phosphonates, itaconic acid, and 3-allyloxy-2-hydroxy-propionic acid. In some embodiments, the drilling fluid may include metal sulfide scale removal agents such as hydrochloric acid.

In some embodiments, the drilling fluid further comprises a chelating agent. The chelating agent may include, but is not limited to, dimercaprol (2,3-dimercapto-1-propanol), diethylenetriaminepentaacetic acid (DTPA), hydroxyethylenediaminetriacetic acid (HEDTA), and ethylenediaminetetraacetic acid (EDTA).

Concentration of components of the drilling fluid may be varied to impart desired characteristics of the drilling fluid.

In some embodiments, the drilling fluid further includes 2 to 4 wt. % of surfactant, 4 to 6 wt. % of the viscosifier, 0.25 to 3.0 wt. % of the hydrogen sulfide scavenger, 0.4 to 0.7 wt. % of the at least fluid loss prevention agent, 0.6 to 1.0 wt. % of the pH adjusting agent including the alkali metal base, 0.25 to 2 wt. % of the clay stabilizer including the alkali metal halide salt, and 0.05 to 0.5 wt. % of the filtration rate agent, each based on a total weight of drilling fluid.

In some embodiments, the surfactant is at least one selected from the group consisting of sorbitan oleate and rhamnolipid surfactant, the viscosifier is the bentonite, the fluid loss prevention agent is the at least one selected from the group consisting of the corn starch and the PVBA. In some embodiments, the fluid loss prevention agent is a mixture of the corn starch and the PVBA. In some embodiments, the fluid loss prevention agent is a mixture of 85 to 90 wt. % of the corn starch and 10 to 15 wt. % of the PVBA, each based on the total weight of the mixture.

In some embodiments, the alkali metal base is the sodium hydroxide, the alkali metal halide salt is the potassium chloride, and the filtration rate agent is the sodium carbonate.

In some embodiments, the drilling fluid performs sweetening of the sour gas. The sour gas may be bubbled into the drilling fluid to get devoid of the hydrogen sulfide. The present disclosure also relates to the hydrogen sulfide scavenging during a well stimulation. In some embodiments, the present disclosure represents the hydrogen sulfide scavenging during a metal sulfide scale removal using concentrated hydrochloric acid, sulfuric acid or any other hydrogen sulfide-generating scale removal solvents.

The examples below are intended to further illustrate protocols for preparing, characterizing, and using the drilling fluid and for performing the method described above and are not intended to limit the scope of the claims.

Where a numerical limit or range is stated herein, the endpoints are included. Also, all values and subranges within a numerical limit or range are specifically included as if explicitly written out.

Obviously, numerous modifications and variations of the present invention are possible in light of the above teachings. It is therefore to be understood that, within the scope of the appended claims, the invention may be practiced otherwise than as specifically described herein.

EXAMPLES

Example 1

A catalyst was synthesized using an impregnation method. Loading of manganese precursor (such as $Mn(NO_3)_2 \cdot 4H_2O$) on gamma ($\gamma$) alumina was 0.5 (i.e., a molar ratio of Mn: $Al_2O_3$ is 1:2) to form a mixture. The mixture was stirred at room temperature (RT) using a magnetic stirrer until a thick paste was formed. The paste was dried at 50 degrees Celsius (° C.) using oven until a dry material is obtained. The dry material was calcined at 400° C. for 4 hours under an air environment in order to oxidize $Mn(NO_3)_2 \cdot 4H_2O$ into manganese oxide(s).

Example 2

Hydrogen sulfide scavenging tests were performed using a glass column reactor, also referred to as the 'bubble column reactor' or 'reactor'. A column has a fritted porous circular disk at the bottom. In the beginning of the hydrogen sulfide scavenging test, 10 milliliters (mL) distilled water containing 25, 50 or 100 milligrams (mg) of the scavenger ($Mn/Al_2O_3$) was placed in the column. Then, a valve at the bottom of the column (just below the fitted disk) was opened to allow a sour gas (100 parts per million (ppm) hydrogen sulfide in methane) to flow into the column in the form of small gas bubbles. The gas flow rate was kept constant at 100 mL/minute. The gas exiting the bubble column reactor was sent to a hydrogen sulfide gas detector with a detection limit of 0.5 ppm. The exiting gas from the reactor was monitored and the concentration of the hydrogen sulfide in the treated gas was continuously recorded until the concentration of the hydrogen sulfide in the treated gas stream reached or exceeded 10 ppm.

Figure 2:
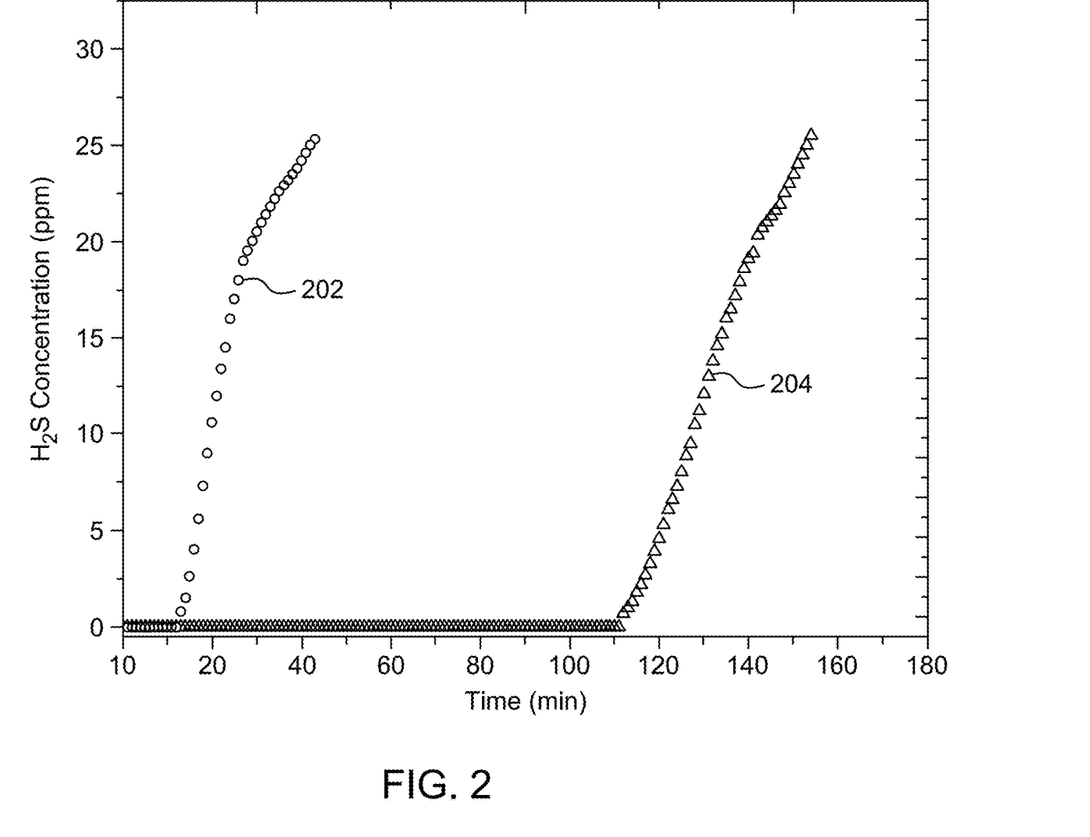
FIG. 2 is a graph depicting breakthrough curves of hydrogen sulfide obtained using aqueous dispersions of $Fe/Al_2O_3$ and $Mn/Al_2O_3$, according to certain embodiments.

FIG. 2 is a graph depicting hydrogen sulfide breakthrough curves (a first curve 202 corresponding to the breakthrough curve of the hydrogen sulfide obtained using an aqueous dispersion of 25 mg of $Fe/Al_2O_3$ and a second curve 204 corresponding to the breakthrough curve of the hydrogen sulfide obtained using the aqueous dispersion of 25 mg of the $Mn/Al_2O_3$). The hydrogen sulfide scavengers were dispersed individually in 10 mL distilled water, giving a concentration of 2.5 mg $Fe/Al_2O_3$ per millileter distillate water and 2.5 mg $Mn/Al_2O_3$ per millileter distillate water to form the corresponding solutions. The utilized concentration of the $Fe/Al_2O_3$ and the solution volume were 2.5 mg/mL and 10 mL, respectively. A feed sour gas contained 100 ppm hydrogen sulfide in the methane. The gas flow rate was kept constant at 100 mL/min. The scavenging process was conducted at the RT and atmospheric pressure in the bubble column reactor.

Figure 3:
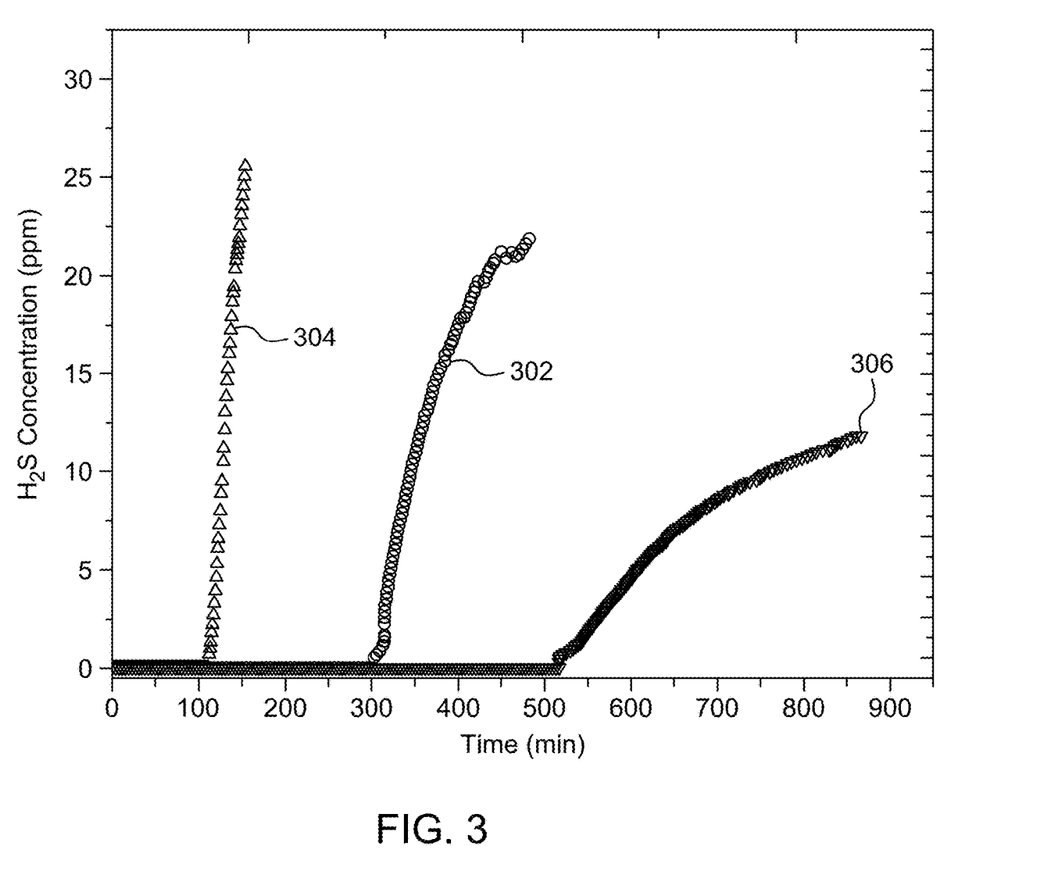
FIG. 3 is a graph depicting breakthrough curves of the hydrogen sulfide obtained using various aqueous dispersions of the $Mn/Al_2O_3$, according to certain embodiments.

FIG. 3 is a graph depicting hydrogen sulfide breakthrough curves (a first curve 302, a second curve 304 and a third curve 306 corresponding to the breakthrough curve of the hydrogen sulfide obtained using the aqueous dispersion of 2.5, 5 and 10 mg of the $Mn/Al_2O_3$ per millilter distillate water). The total volume of the solution was 10 mL. A feed sour gas contained 100 ppm hydrogen sulfide in the methane. The gas flow rate was kept constant at 100 mL/min. The scavenging process was conducted at the RT and atmospheric pressure in the bubble column reactor.

Example 4

Conversion of the hydrogen sulfide into the manganese sulfide and the elemental sulphur (depending on the pH of the drilling fluid) by the hydrogen sulfide scavenger are shown by equation (1) and equation (2).

$$MnO_2 + 2H_2S \rightarrow MnS + S + 2H_2O \quad (1)$$

$$MnO + H_2S \rightarrow MnS + H_2O \quad (2)$$

Hence, the present invention represents that the hydrogen sulfide scavenging occurs during a metal sulfide scale removal. Capturing and converting the hydrogen sulfide into the elemental sulfur or sulfates during the metal sulfide scale removal prevents the release of the hydrogen sulfide into a well surface. The manganese sulfide produced in-situ by the hydrogen sulfide scavenger may act as a viscosifier and/or a weighting agent. Thus, the specific hydrogen sulfide scavenger described herein may be particularly advantageous for proving a secondary viscosifier and/or weighting agent as a result of reacting with hydrogen sulfide.

The invention claimed is:

1. A method of drilling a subterranean geological formation, comprising:
    driving a drill bit to form a wellbore in the subterranean geological formation thereby producing a formation fluid comprising hydrogen sulfide; and
    injecting a drilling fluid into the subterranean geological formation through the wellbore,
    wherein the drilling fluid consists of:
        water, and
        particles of a manganese oxide supported on a porous aluminum oxide support suspended in the water; and
    reacting the particles of a manganese oxide supported on the porous aluminum oxide support with the hydrogen sulfide present in the formation fluid to form a manganese sulfide,
    wherein a concentration of the hydrogen sulfide is 0 ppm for 110-500 minutes following the reacting, and
    wherein the particles of the manganese oxide supported on the porous aluminum oxide support are present in the drilling fluid in an amount of 2.5-10 wt. %, based on a total weight of the drilling fluid.

2. The method of claim 1, wherein the aluminum oxide is gamma ($\gamma$) aluminum oxide.

3. The method of claim 1, wherein the particles of the manganese oxide supported on the porous aluminum oxide support have a molar ratio of manganese to aluminum of 1:1 to 1:5.

4. The method of claim 1, wherein the particles of the manganese oxide supported on the porous aluminum oxide support have a mean particle size of 100 to 10,000 nanometers (nm).

5. The method of claim 1, wherein the particles of manganese oxide have a mean particle size of 5 to 150 nm and are on at least one selected from the group consisting of an exterior surface of the porous aluminum oxide support and within pores of the porous aluminum oxide support.

6. The method of claim 1, wherein the formation fluid is a sour crude oil or a sour gas.

7. The method of claim 1, further comprising flowing hydrogen sulfide gas into the drilling fluid.

8. The method of claim 7, wherein the flowing of hydrogen sulfide gas is an amount of 100 mL/minute.

9. The method of claim 1, wherein the particles of the manganese oxide supported on the porous aluminum oxide support have a molar ratio of manganese to aluminum of 1:2.

* * * * *